United States Patent [19]

Smith et al.

[11] Patent Number: 5,193,352
[45] Date of Patent: Mar. 16, 1993

[54] AIR PRE-COOLER METHOD AND APPARATUS

[75] Inventors: Glenn W. Smith, Mt. Airy; William D. McCloskey, Baltimore; Robert E. Cates, Arnold, all of Md.

[73] Assignee: AMSTED Industries, Inc., Chicago, Ill.

[21] Appl. No.: 695,430

[22] Filed: May 3, 1991

[51] Int. Cl.$^5$ ............................................. F25D 17/06
[52] U.S. Cl. ............................................ 62/90; 62/95; 62/201
[58] Field of Search ............... 62/90, 91, 92, 95, 96, 62/310, 201

[56] References Cited

U.S. PATENT DOCUMENTS

| | | | |
|---|---|---|---|
| 2,212,579 | 8/1940 | Anderson | 62/310 X |
| 3,320,760 | 5/1967 | Swearingen | 62/141 |
| 3,563,304 | 2/1971 | McGrath | 165/2 |
| 4,137,058 | 1/1979 | Schlom et al. | 62/121 X |
| 4,380,910 | 4/1983 | Hood et al. | 62/95 X |
| 4,964,279 | 10/1990 | Osborne | 62/59 |
| 4,966,007 | 10/1990 | Osborne | 62/101 |

OTHER PUBLICATIONS

Oliker; Electric Power Research Institute, Jun. 1990.
Ondryas et al.; The American Society of Mechanical Engineers Jun. 1990.
Cohen; International Air Conditioning & Refrigeration Forum Jan. 1990.
Schorr NO$_x$ Emission Control for Gas Turbines 1991.
Freezing Energy Costs, New Technologies in Industry 1988.
Balitmore Aircoil Advertising Photo, 1988.

*Primary Examiner*—William E. Wayner
*Attorney, Agent, or Firm*—Edward J. Brosius; F. S. Gregorczyk

[57] ABSTRACT

An apparatus and method for cooling, air which apparatus includes an indirect evaporative cooler, a direct-contact ice-water chiller, a reheat coil component, an ice-thermal-storage component and an ice-manufacturing refrigeration chiller to provide alternative air-flow paths and alternative component combinations. The method provides alternative fluid-flow paths through electable combinations of the several components to effect the desired lowering of air temperature, relative humidity and air density in the cooled air.

36 Claims, 12 Drawing Sheets

AIR PRE-COOLER METHOD AND APPARATUS

BACKGROUND OF THE INVENTION

The present invention provides an inlet air pre-cooler arrangement for gas turbines and other air breathing apparatus, but will be particularly discussed for gas turbine. More specifically, a pre-cooling system with a plurality of electable alternative modes is operable to reduce, below ambient air temperature, the temperature of the inlet air charged to a gas turbine; reduce or control the humidity in the inlet air to the compressor of a gas turbine; and, increase the density of the air communicated to the gas turbine compressor.

Gas turbines, which broadly include an air inlet, a compressor, a combustion chamber, turbines and an exhaust, compress incoming air flow for mixing with fuel prior to ignition of the air-fuel mixture in the combustion chambers for generation of high-temperature gasses to drive the turbine. Gas turbines are utilized for the generation of mechanical power for vehicles, such as aircraft, and are also coupled to an electrical generator in the electrical power-generating industry for the generation of electrical power, especially during peak-load periods. Gas turbine usage for electrical power generation, or a gas-turbine generator, is particularly prevalent during the summer months to supplement normal power (e.g., steam or hydroelectric) generating plants for peak power demand during very hot days when air conditioning demands frequently cause an increased power demand. The gas turbine generators are also used for base-load systems in smaller utilities, and for co-generation systems. However, gas-turbine-generator KW output rating or thermal efficiency is inversely proportional to the inlet air temperature to the gas turbine-generator. That is, the gas turbine-generator is less efficient with inlet air at elevated temperatures, such as 95 degrees Fahrenheit (35° C.), than it is with air at 20 degrees Fahrenheit (−7° C.), which fact has been known in the turbine industry for many years.

Various apparatus and methods have been utilized to reduce the temperature of inlet air to a gas-turbine-generator to minimize the impact or disadvantage on gas turbine generator output. However, the increased demand for electrical generator power output is frequently required at peak-use periods, such as hot summer days, during maximum power usage for cooling, which unfortunately is usually the time period with the highest ambient air temperature. Thus, the increased electric-power and the economic cost to reduce the temperature of the inlet air to the gas-turbine compressor is frequently unjustified, as the added power cost for inlet air-temperature reduction may be greater than any potential gains in gas-turbine power output. Therefore, the power-generating industry continues to seek methods and apparatus with minimal associated costs to lower inlet air temperature for gas turbines.

One frequently utilized air cooling apparatus for temperature reduction of gas-turbine inlet air is an in-line evaporative cooler ahead of the gas-turbine inlet, which acts as a direct evaporative cooling (DEC) apparatus. However, the temperature reduction from this DEC apparatus may only be approximately 85% of the dry-bulb/wet-bulb temperature differential. More importantly, the DEC apparatus cannot produce any significant benefit unless ambient relative humidity is well below 75%, and preferably between about 20 to 60%. As an example, ambient air with a dry-bulb temperature of about 95 degrees Fahrenheit (35° C.) and wet bulb temperature of about 78 degrees Fahrenheit (25° C.) may only be depressed to a dry bulb temp of about 80.5 degrees Fahrenheit (27° C.). In addition, the relative humidity of this reduced-temperature air may be in excess of 90% (percent) or, in fact, may be, during sudden weather changes, water-saturated with entrained water particles, which particles may impinge and abrade or otherwise damage the turbine blades.

Although chilled or cooled gas turbine inlet air is preferred and, as noted above, aids in an increase of the gas turbine-generator capacity, the selection of a specific chilled air temperature impacts upon the output capacity of the gas turbine-generator. The temperature of the turbine compressor inlet air must be above 32 degrees Fahrenheit (0° C.) to prevent ice buildup on the compressor blades, as the chilled inlet air may be at 100% relative humidity or have entrained moisture carry-over from the air-chilling process. Further, the rapid increase in air velocity in the compressor inlet results in a static pressure drop in the air of as much as 4 inches of water, which may result in a further temperature drop and moisture condensation. Thus, it may be desirable and more advantageous to have the chilled inlet air at about 45 degrees Fahrenheit (7° C.) and about 85% relative humidity, which more readily accommodates variations in the air temperature and humidity while preserving the improved operational integrity of the gas turbine with the chilled air. The relative options and benefits of inlet air chilling for gas turbine utilization are discussed in the article "Options in Gas Turbine Power Augmentation Using Inlet Air Chilling", which paper was presented at the 1990 Gas Turbine and Aeroengine Congress and Exposition in Brussels, Belgium.

A cooling tower is a familiar structure associated with cooling apparatus, which cooling tower is generally a fluid (e.g. water) recirculating arrangement acting to reject heat to the atmosphere. The cooling tower usually has a heat exchange apparatus in its fluid circuit with the fluid recirculated through the heat exchanger by a pump for return to the cooling tower and gravity feeding over a heat-exchange media. The recirculating cooling tower and heat exchanger arrangement adds both heat and water vapor to the air transferred therethrough and generally requires a makeup water system as a great deal of cooling fluid will evaporate.

In a direct evaporative cooling system, which is an air cooling and humidification device circulating air over direct heat exchange air-to-water media such as an air washer, cooling and humidification generally occur when air is passed through a continuously recirculating cold water spray. This is a constant enthalpy process, as any evaporation requires heat to be withdrawn from the air (i.e., a temperature drop), and the recirculating water temperature is concomitantly reduced to the wet bulb temperature of the incoming air. After a period of time, except for slight pump-energy heating, the recirculating water attains approximately the air wet-bulb temperature through a purely evaporative means. The evaporative cooler does not utilize a heat exchanger as opposed to a cooling tower, and discharges air which is reduced in dry-bulb temperature and is essentially moisture saturated, that is it typically has a relative humidity above 90%. However, moisture in the cooled air transferred to another apparatus from the evaporative cooler should be kept from freezing when the air temperature drops and, therefore, the entering wet-bulb temperature should be kept well above 32 degrees Fahrenheit (0° C.), such as 40 degrees Fahrenheit (4.5° C.) minimum. Even though evaporative coolers cannot produce cold air exhaust on warm days, the air discharged from the direct evaporative cooling system will be cold, on a cold ambient day, and it may be necessary to reheat the air before sending the moisture saturated air to a gas turbine inlet, which reheating controls the humidity and allows further evaporation of any water droplets in order to inhibit moisture freezing on the downstream apparatus.

Reducing the temperature of the cooling fluid in the DEC apparatus below the entering-air wet-bulb temperature, such as by ice-water in a separate structure, can further decrease the discharged-air temperature below the ambient-air, wet-bulb temperature. When a DEC discharge water temperature falls below the entering air dew-point, this results in both an air temperature decrease below the wet-bulb temperature and dehumidification. The final temperature of discharged water will depend upon external heat removal and water quantity transferred through the air washer, but when the air dry-bulb temperature is depressed below ambient dew-point conditions, some moisture will condense from the air. Thus, depression of the coolant fluid (usually water) temperature in a direct evaporative cooler to a temperature well below the dew-point with a constant water volume flow will can depress below the dew-point both the wet-bulb and dry-bulb temperatures of the air flowing through the DEC apparatus. However, ambient air parameters such as wind velocity, temperature and humidity can fluctuate rapidly as weather patterns change, which can affect the heat transfer characteristics of a direct contact chiller (i.e., DEC-ice water and heat-removal coupled apparatus) causing excessive chilling of the discharge air, perhaps to 35 degrees Fahrenheit (2° C.) or lower, which could lead to freezing deposits at the lower pressure region of a turbine inlet cone, for example. Thus, auxiliary equipment may be required to provide discharge air to a gas-turbine inlet at an assured-minimum controlled temperature and assured-minimum relative humidity.

Although it is known that chilling the inlet air for use in a gas turbine will enhance the efficiency and operation of the gas turbine, the chilled inlet air has to be provided controllably, efficiently, economically and without adding unwanted auxiliary power consumption during peak load operations. The preferred turbine inlet air "quality" is dependent upon the differential between the ambient air wet and dry bulb temperatures, as well as the desired inlet air relative humidity, the barometer pressure and the overall change in air density. All of these parameters reflect the character of the reduced temperature air and impact on the operation of the gas turbine. Therefore, it is necessary to consider all of these parameters when providing a mass flow rate of air at a reduced temperature to a gas turbine.

The precise characterization or desired air temperature and/or humidity of air conditions are noted in a psychrometric chart, which provides semi-empirical relations giving the air thermo-physical properties in terms of the barometer and psychrometer readings. The psychrometer is an instrument for measurement of the wet and dry-bulb temperatures of air. Psychrometric charts are nomograms constructed to provide convenient determinations of the properties of air-water vapor mixtures, such as humidity, dew-point, enthalpy, specific volume and water-vapor pressure as functions of barometric pressure and temperatures obtained with a psychrometer. Thus, a design inlet air temperature of 45 degrees Fahrenheit (7° C.) and 85% relative humidity for a gas turbine in the example provides a reasonable operating temperature at an acceptable relative humidity with minimal concern for potential ice buildup on turbine blades while accommodating unexpected weather variations. Control of the inlet air mixture is not accommodated by use of a direct evaporative apparatus or cooling tower, as the air communicated through the tower may be reduced in temperature to approximately the wet-bulb temperature of the ambient air but it may also become water saturated. This latter condition can prevent entrained water droplets in the air flow from further evaporation, which may damage the turbine blades. Thus, it is desirable to control the humidity of the turbine inlet air to minimize the potential for transfer of entrained water droplets from the DEC to the turbine inlet. Air with a maximum of 85% relative humidity allows for further evaporation of water droplets in the air path between the DEC exit and turbine inlet.

In an article, "Advances in Technology With potential for Air Conditioning and Refrigeration" by Raymond Cohen, an alternative gas turbine air enhancement arrangement is provided by a system, which uses finned-tube closed-circuit cooling coils cooled by a glycol/water solution from an off-peak ice freezing system, using the same fluid for off-peak freezing of ice. Air is communicated past these cooling coils to reduce its temperature from a nominal reference temperature of 90 degrees Fahrenheit (32° C.) to approximately 60 degrees Fahrenheit (16° C.) for injection or communication to a gas turbine coupled to a generator for producing electric power. An off-peak-operable ice chilling system manufactures and stores ice during electrical power off-peak hours. The stored ice is utilized to reduce the cooling fluid temperature in the cooling coils during turbine usage for reducing the inlet air temperature communicated to the gas turbine. However, the system has no provision for control of the relative humidity, requires a high external static loss type of fin-coil heat exchange, and terminal temperature difference associated therewith, and the reduction in air temperature is limited by the single stage operation of the system without flexibility for other operating modes.

U.S. Pat. No. 4,137,058 to Schlom et al provides an indirect evaporative heat exchanger with walls having wet and dry sides for cooling a gas for a turbine compressor. The heat exchanger provides a cool dry air stream and a cool moist air stream on either side of these walls for communication to a power turbine compressor inlet and intercooler. In alternative embodiments, indirect evaporative cooling units are connected in series to provide cool dry air from the first unit as an inlet air to both the wet and dry sides of the second indirect evaporative cooler. The resultant very cool moist air from the second indirect evaporative cooler is combined with the cool moist air from the first indirect evaporative unit and is utilized for a two-stage gas compression system intercooler. The resultant cool dry air is used as an inlet air to the gas turbine air compressor. In a third embodiment, the dry cool air stream and a moist cool air stream emitted from the indirect evaporative cooler are combined and transferred for use as an inlet air stream to the turbine air compressor, however, no cool air is provided to the intercooler in this disclosed embodiment.

In a final embodiment, the dry cool air stream from the indirect evaporative cooler is used as an inlet air stream for the wet side of the indirect evaporative cooler and the resultant, supposedly very cool moist air is then utilized as an inlet air charge for the turbine air compressor.

The known air-cooling apparatus, which include mechanical chillers, evaporative air coolers and absorption chillers, may provide a cool, or cooler than ambient, inlet air temperature to a gas turbine to enhance its efficiency and operating performance. However, no consideration has been given to control of entrained moisture droplet elimination, air density, relative humidity at a specific temperature in the inlet air volume, or off-peak thermal storage ice manufacture and harvest, which ice provides on-peak operations without the electrical energy demand of refrigeration compressors on-line. Further, they are a much greater first cost, are less economically operable and frequently put an added electrical burden on gas turbines coupled to electrical generators.

The present air-cooling apparatus provides a direct contact chiller with the flexibility for alternative operation as a direct evaporative cooler, and further operable cooperation with ancillary air-treatment structures to pre-cool and control discharge air temperature and humidity. More particularly, this apparatus is coupled to a gas-turbine to provide reduced temperature air without the necessity to provide and operate full-sized vapor-compression system an expensive compressor during peak-load hours, the gas-turbine is connected to an electrical generator.

In an ideal condition, an air precooling system for a gas turbine would provide inlet air to the gas turbine with the maximum increase in air density and control of the inlet air properties, such as temperature and relative humidity. The precooling system would be operable in various modes to systemize the properties of the inlet air while minimize the operating costs and match operating conditions to existing weather and generating load variances. In the case of a gas turbine coupled to an electrical generator, such generators are frequently utilized to supplement normal generating capacity from hydra-power, nuclear power, on-line fossil-fuel combustion or other generating means. A thermal storage apparatus in cooperation with a direct contact chiller, an indirect evaporative cooler and a reheating apparatus can provide chilled air at a reduced temperature and controlled relative humidity at a nominal cost by utilizing off-peak operations to generate a cold mass for reducing coolant temperature for reaction with warm ambient air during any demand period, which is generally a peak on high demand period for gas-turbine generators. This provides a system that can incorporate relatively smaller systems to provide the cold mass, which is usually ice, as it is developed over a long-term such as 12 to 16 hours for reaction with the coolant for a short term during precooling system operation. The economics of the thermal storage system are enhanced by the increased turbine KW output and the increase in turbine efficiency and may be compared to the utility provided incentives to certain customers, primarily for commercial HVAC (heating, ventilating and air-conditioning) operations, to reduce electrical consumption during high-load or peak-load periods. Indicative of these peak load periods are the extremely high mid-afternoon temperatures in the summer months, which in some locales result in "brownouts". In this brownout condition, local utilities resort to purchasing power from other generating plants, if it is available, or operating on reduced voltage outputs or other methods to utilize available power in these high-load periods. Consequently, it is quite evident that utilizing scarce and more expensive power during a high-load period to reduce the turbine air inlet temperature is not economically reasonable. Further, it can be demonstrated that it is possible to continuously utilize a thermal storage system at a controlled rate to reduce turbine inlet air temperature.

An unobvious benefit from the reduction of the air temperature below the dew-point is the recovery of condensate moisture, which is essentially demineralized water, for utilization by ejection into gas turbine combustion zones in the control of nitrogen oxide emissions.

SUMMARY OF THE INVENTION

The present invention provides an air pre-chilling system for reducing discharge air temperature below ambient air temperature, controlling the relative humidity of the discharge air, concomitantly increasing air density and generally controlling entrained moisture or water droplets. The pre-cooling apparatus has alternative air flow paths to accommodate variations in the ambient air conditions, as well as, making alternative inlet air characteristics available to the user. The desired inlet-air characteristics are provided by utilization of the individual cooling and air transfer capabilities of the components within the system, which components are capable of varying the discharge air temperature, relative humidity, and, consequently, the density of the air. In a particular embodiment, provision may be made for the alternate utilization of a single cooling tower and heat transfer cycle on a diurnal cycle to serve more than one component to minimize the structural requirements of the apparatus. The air pre-chilling system is operable to reduce air temperature and humidity for ambient air up to 100% relative humidity.

More specifically, a diurnal system uses an off-peak ice making chiller plant (IMP), for reducing the temperature of ice-water coolant fluid and freezing ice, storing ice and then reheating ice for a direct-contact heat and mass exchanging, ice-water-fed heat transfer media, which may be serially arranged in the air stream flow with an indirect evaporative air cooler having a cooling tower and finned coil bank, and a reheating coil-bank for production of relatively low cost, reduced-temperature and humidity inlet air for an air-consuming device, such as a gas-turbine. Ice chilling and storage provide the availability of reduced-temperature coolant fluid, or ice-water for reduction of the inlet air temperature to a gas turbine below the temperature attainable by mere recirculation of a coolant fluid, which is limited by the ambient air temperature.

BRIEF DESCRIPTION OF THE DRAWINGS

In the figures of the drawings, like reference numerals identify like components, and in the drawings.

DETAILED DESCRIPTION OF THE INVENTION

Figure 1:
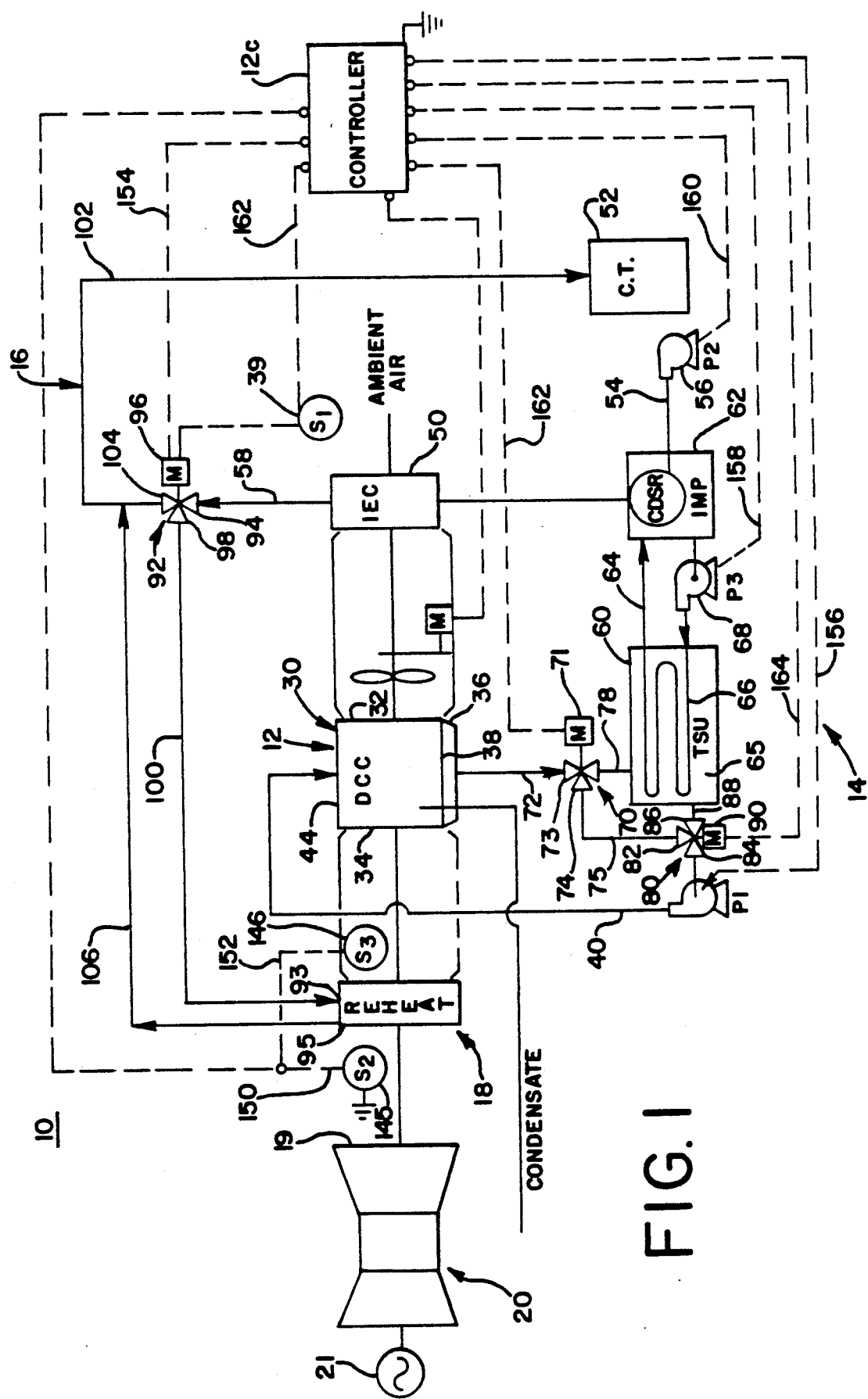
FIG. 1 is a schematic diagram of a preferred embodiment of the air pre-chilling system coupled to an air consuming apparatus shown as a gas turbine.

An air chilling system 10 to provide reduced temperature air to an air consuming apparatus, such as a gas turbine 20, is schematically illustrated in FIG. 1. Although system 10 is operable with any apparatus, such as an air-breathing engine or heat exchanger, or large capacity air conditioning system, such as a theatre or enclosed stadium, the structure and operation will be described with reference to gas turbine 20, which is coupled to an electrical generator 21. This coupled turbine-generator arrangement is not uncommon in the power generating industry and is frequently utilized as a rapidly actuable power generating assembly at periods of increased or peak demand, as well as representing the only power generating construction for certain utilities.

Figure 10:
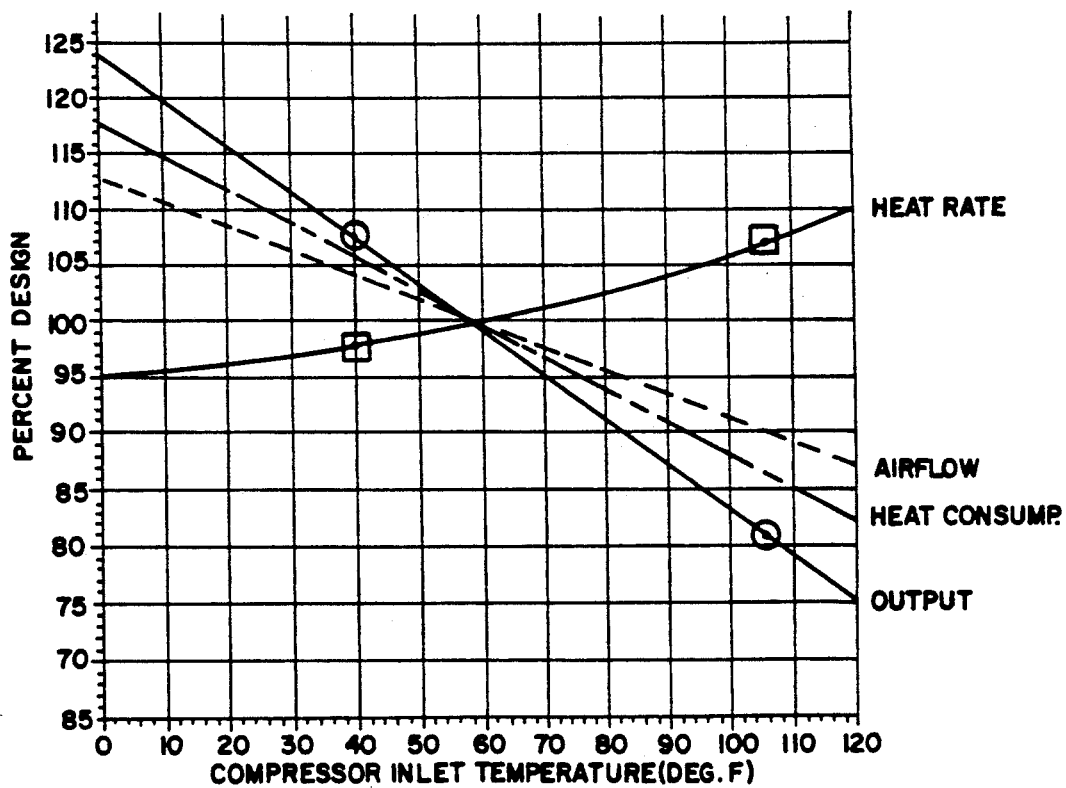

Provision to a gas turbine-generator of reduced temperature or increased density air, as related to ambient air, generally provides an increase in turbine operating efficiency and output capacity or generator KW. The improvement in turbine-generator efficiency is illustrated in FIG. 10, which shows percentage change from design capability as a function of compressor (turbine) inlet temperature. The variables of heat rate, air flow, heat consumption and output. It is clearly evident that, with a lowering of inlet air temperate, the gas turbine-generator power output increases as the heat rate decreases. As an example, a change in inlet air temperature from about 105° F. to 40° F. will reduce the heat rate about 9%, but it will improve the output approximately 35%. The efficiency of the turbine 20 and generator 21 arrangement is improved whenever heat rate decreases or when the kilowatt output increases at the same operating conditions.

In the preferred embodiment of FIG. 1, air cooling system 10 for gas turbine 20 has a direct-contact chiller, DCC, 12 coupled to an ice-chilling assembly 14, an indirect evaporative cooling (IEC) apparatus 16, and an outlet air humidity-controlling reheating coil 18. Each of DCC 12 and IEC 16 are independently operable to cool the inlet air to gas-turbine 20 below ambient air temperature and, these components may operate either separately or in conjunction with each other and any of ice-chiller 14 and coil 18 for enhanced inlet-air humidity control or temperature reduction. Several potential operational sequences for system 10 are illustrated in a block diagram in FIG. 3, but these are merely illustrative and not a limitation. In the illustrated embodiment of FIG. 1, the arrangement, placement and order of components are shown in an aligned linear relation, however, the physical arrangement for communication of air flow past or through an individual component, element or sequence of elements may be accommodated by dampers, ducts, conduits, baffles or other known physical air transfer devices to provide a selected operational mode and physical component assembly.

Figure 2:
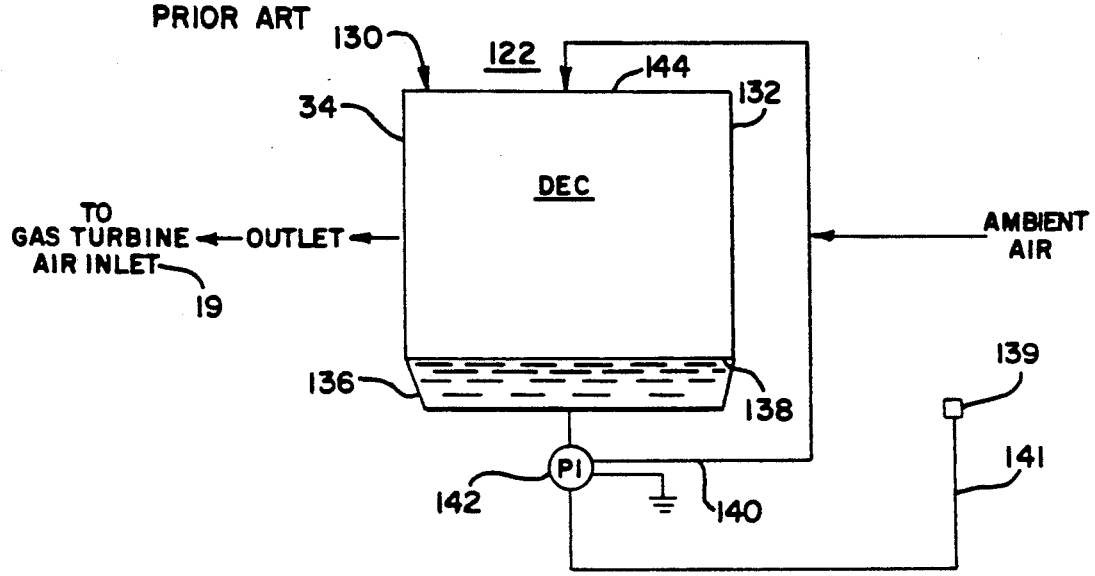
FIG. 2 illustrates a known evaporative cooling apparatus for delivery of evaporatively cooled air to a gas turbine compressor air inlet.

In FIG. 2, a conventional direct-evaporative-cooler, DEC, 122 is operable to cool ambient air communicable to turbine air inlet 19. As an example of the DEC cooling effect, ambient air with a dry-bulb temperature of 95.8 degrees Fahrenheit (36° C.) (wet bulb temperature of 69.2 degrees Fahrenheit (21° C.) and 25% relative humidity) is directed through evaporative cooler 130 of DEC 122, which has a cooling media on structural apparatus to provide a fluid flow path for the cooling fluid. Air is discharged from cooler 130 at outlet side 134 for transfer to turbine compressor inlet 19 with a dry bulb temperature of 72.9 degrees Fahrenheit (22.7° C.) and a relative humidity of 85%. Ambient air is introduced to evaporative cooler 130, which may physically resemble a cooling tower system without a heat load in the water circuit, at inlet side 132, and is discharged at outlet side 134 for communication to turbine inlet 19 of gas turbine 20. A sump or pan 136 at evaporative cooler, base 138 receives fluid for recirculation, such as water, from evaporative cooler 130. Conduit 140 with in-line pump 142 connects sump 136 with evaporative cooler upper surface or water inlet passage 144 for communication and recirculation of water through evaporative cooler 130 to cool and humidify incoming ambient air.

Pump 142 may be continuously or cyclically operable in response to a signal, which signal may be provided either manually or automatically. As an example, a sensing apparatus 139, such as a thermocouple for sensing ambient air temperature, may protrude into the ambient air stream path to monitor its temperature. Thermocouple 139 is coupled to pump 142 by line 141 and, provides a signal of the sensed ambient air temperature to actuate pump 142 for recirculation of the coolant fluid through conduit 140 to upper surface 144. Various parameter sensing apparatus and controlling means are known in the art but not specifically shown in FIG. 2.

DCC 12 of the present invention is illustrated in FIG. 1 with a diagrammatic structure similar to the structure of FIG. 2 and is operable to reduce the temperature of inlet air to turbine 20. In the structure of DCC 12, ambient air is introduced to direct-contact chiller unit 30 at inlet side 32, and discharged at outlet side 34 for downstream communication to gas turbine 20. Sump 36 at base 38 of DCC unit 30 collects warmed cooling fluid, which may include condensate from the air, from DCC unit 30 for recirculation to thermal storage unit or ice tank 60. In FIG. 1, conduits 72, 75 and 40 with first in-line pump 42 connects sump 36 with inlet passage 44 of unit 30 for communication and recirculation of coolant fluid through DCC unit 30. Pump 42 is also connected between ice-storage tank 60 of assembly 14 through a recirculating network described below. DCC unit 30 may be a counter-flow, parallel-flow or cross-flow heat exchange media-to-air unit, as its particular structure is not a limitation to the present invention. In the figures, a cross-flow type heat exchange media is illustrated.

In the structure of FIG. 1, several components may be operable, either automatically or manually, in response to a signal from a sensing apparatus 39, which may monitor temperature, the initiation of operation of system equipment or other fluid-related parameters. In FIG. 1, sensor 39 is coupled to servo operator 96 of valve mechanism 92 in an exemplary arrangement, although it may similarly be coupled to any or all of pumps 42, 56 or valves 70 and 80; and, controls within either ice making plant 62 or turbine generator 20. As an alternative arrangement, sensor 39 is coupled to controller 120, which may be coupled to any or all of the several noted components to provide control signals for monitoring, activating or deactivating the individual component. The particular sensor 39 and/or controller 120, such as a computer controlled device, is merely illustrative and not a limitation.

DCC 12 in the FIGURES is connected to ice chiller assembly 14, which includes ice storage tank 60 and refrigeration equipment or ice-making plant (IMP) 62. More specifically, sump 36 is coupled to storage tank or thermal storage unit 60 through conduits 72 and 78, and first valve 70. Ice making plant (IMP) or refrigeration equipment 62 may have a compressor, a condenser, an expansion device (not shown) an alternative evaporator and a pump 68 in a fluid circuit to transfer a reduced temperature refrigerant fluid through conduit 64 and coil 66 in ice storage tank 60 for cooling and freezing at least some of the first coolant from sump 36 on cooling coil 66 in TSU chamber 65. Ice making plants (IMP) 62 and storage tank to TSU 60, which are components of ice-chiller assembly 14, are known in the art, and the specific operating structure and plant configuration are not a limitation to the present invention.

In FIG. 1, TSU 60 receives first coolant fluid from sump 36 of DCC 12, through a fluid circuit with three-way servo valve 70, such as a motor-operated butterfly or globe valve. First valve 70 with servo operator 71 has inlet port 73 coupled to sump 36 by conduit 72, which first valve 70 is also connected at first outlet port 74 by conduit 75 to second servo-valve 80 at second valve inlet port 82. Conduit 78 connects second outlet port 76 of first valve 70 and TSU chamber 65, which valve 70 and conduits 72, 78 can provide a fluid communication path between sump 36 and TSU chamber 65.

In FIG. 1, fluid return conduit 40 with first in-line pump 42 is coupled to second servo-valve 80 at outlet port 84; and TSU chamber 65 is connected by conduit 88 to second servo-valve 80 at second inlet port 86. Second-valve 80 is operable by servomechanism or motor 90, and in cooperation with first valve 70, can couple conduit 40 and pump 42 to one of conduits 88 and 75 to provide alternative paths for fluid communication between sump 36 and pump 42 for recirculation of coolant fluid to DCC unit 30. Valves 70 and 80, and pump 42 may also cooperate to seal fluid flow from sump 36 and tank 60 to conduit 40. Thus, coolant fluid flow from sump 36 may be blocked, directly recirculated to tower 30 through conduits 72, 75 and 40 or alternately routed through TSU 60 for reduction of coolant-fluid temperature before recycling to first cooling tower 30. Alternatively, fluid flow from sump 36 can be proportioned by valves 70 and 80 to partially bypass TSU 60 or a portion of the fluid may be refrozen in TSU chamber 65 when IMP 62 is operating at other then the above-noted off-peak hours, such as in a continuous mode during daytime peak load hours. In the case of water as the coolant fluid, ice is formed and stored in TSU 60 on coil 66, and fluid communicated to TSU chamber 65 from sump 36 for recirculation through conduit 40 is reduced in temperature to about the freezing temperature, which reduced-temperature water will further reduce the discharge air temperature from DCC unit 30 below that temperature attainable with ambient-air temperature coolant.

Figure 9:
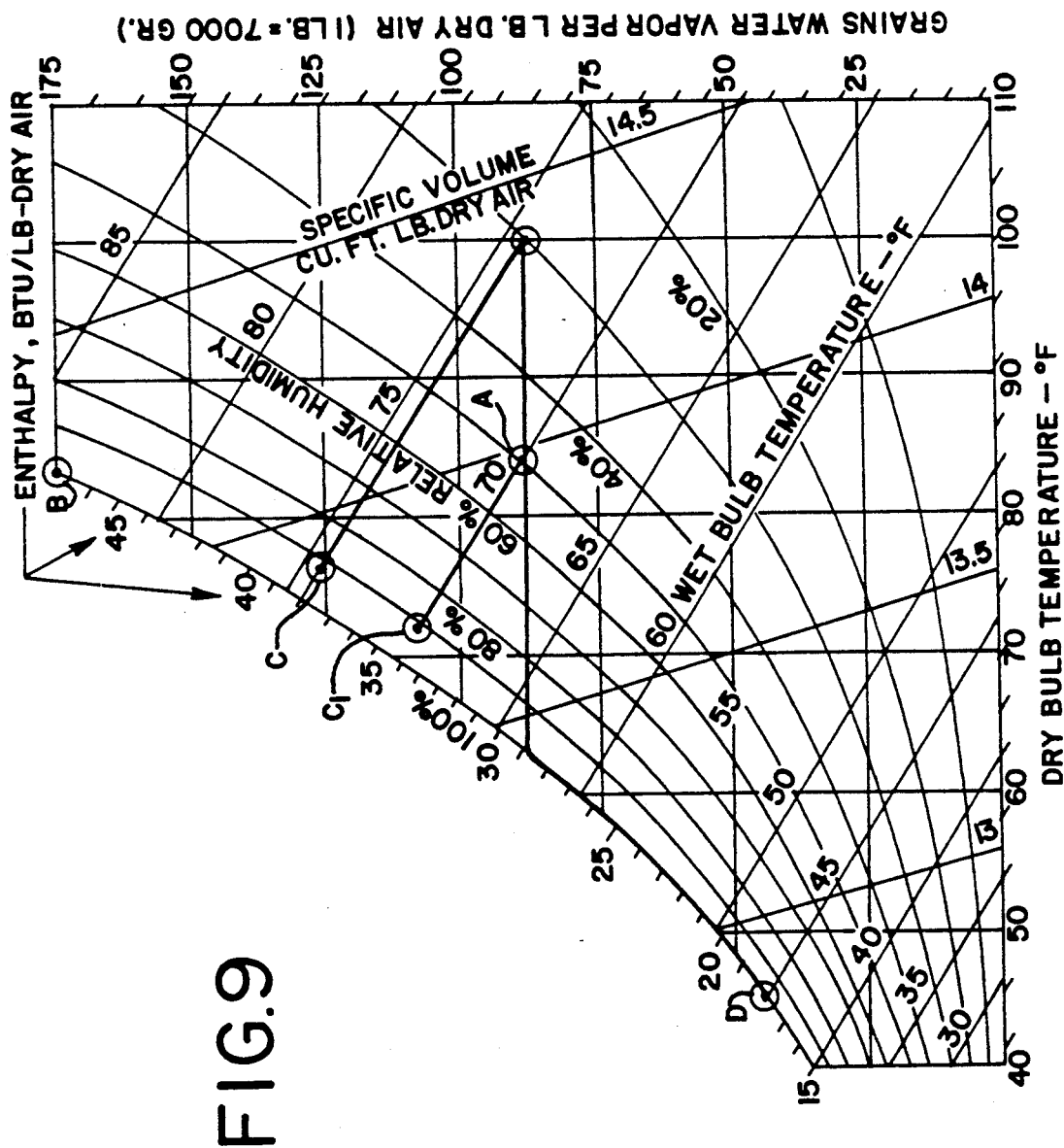
FIG. 9 is a psychrometric chart illustrating the relationship between dry bulb air temperature as a function of the water vapor content per pound of dry air, as well as the relationship between wet-bulb temperature, enthalpy, dew-point, relative humidity and specific volume; and, FIG. 10 is a graphically illustrates the performance capability of a gas turbine KW output and heat rate as a function of the compressor inlet (air) temperature.

The consequence of utilizing DCC unit 30 as an evaporative cooler is shown in an exemplary manner in FIG. 9 wherein incoming ambient air at point Z is reduced in its dry-bulb temperature to point C but has experienced an increase in its relative humidity. Alternatively, the introduction of fluid flow through TSU 60 will depress the temperature from ambient temperature to the dew-point temperature at 100% relative humidity. Thereafter, the air is further reduced in temperature and absolute humidity to approximately point D on the graph as moisture condenses from the air.

Indirect evaporative cooling (IEC) apparatus 16 is operable to sensibly cool air passing therethrough, and in a preferred embodiment includes cooling tower 52 and finned coil 50 as a heat transfer apparatus, as shown in FIG. 1. Coil 50 is connected by conduit 54 with second in-line pump 56 to first cooling tower 52, which pump 56 is operable to circulate a second coolant fluid, such as water, through coil 50 and conduit 54. Coil 50, which is cooled by coolant from tower 52, cools the air passing through finned coil 50 without adding moisture or humidity to the air stream. Dehumidification begins to occur at direct-contact heat exchange media within DCC 12 at an air temperature B in FIG. 9, and continues to dehumidify on condense moisture fromo the air as it is cooled further to point D, below the dew-point of the incoming air. The condensed moisture on media of DCC 12 combines with recirculating ice-water, drains to sump 36 and may be recovered for demineralized water use by overflow control and piping between sump 36 and other storage, treatment, or equipment.

In FIG. 1, conduit 54 is shown as coupled to and through IMP 62. In this configuration, conduit is cycled through the plumbing network of IMP 62 during the operating cycle of IEC 16 without any heating or mechanical work by the tubing network. However, cooling tower 52 may also operate in cooperation with IMP 62 for cooling during the ice-making operations, thus reducing the components required for system 10 while providing the requisite operational functions.

Although it is known that all the air passing through coil 50 does not contact the coil or fins, as a pragmatic consideration the incoming or ambient air volume passing through coils 50 may be treated as contacting coil 50, as that air not directly contacting the coils is blended with the directly contacting air to provide an average discharge air temperature. Calculation and accommodation of the relative amounts of such specific coil contacting and non-contacting portions of the air volume may be accounted for by mathematical functions, such as the bypass factor. In a commercial environment, the specific quantity of non-contacting air mixed with the contacting air provides a generally uniform temperature in the discharged air from coil 50. The cooled air from coil 50 may be directly communicated to turbine 20 through air conduits; transferred through DCC 12 with pump 42 inactivated; transferred through DCC 12 with pump 42 activated either with or without TSU 60 in the fluid flow circuit for further air temperature reduction; and transferred through reheat coil 18. The particular air-flow path is elective by the operator and may be manually selected; automatically provided by baffles and deflectors; or, otherwise directed within system 10.

In the embodiment of FIG. 1, servo control valve 92 with inlet port 94, servomechanism 96, first discharge port 98 and second discharge port 104 is positioned in conduit 54 downstream of finned coil 50. Inlet port 94 and second discharge port 104 are connected upstream and downstream, respectively, in conduit 54 for communication and recirculation of second fluid through conduit 102 to cooling tower 52. Conduit 100 provides an alternate fluid-flow path and connects first discharge port 98 of valve 92 to reheat coil 18 at inlet end 93. Valve 92 is operable to couple conduit 54 at valve inlet port 94 with discharge port 98 to direct second coolant fluid flow through reheat coil 18. Fluid outlet end 95 of reheat coil 18 is connected to conduit 102 downstream of valve 92 for second coolant fluid communication to tower 52. The elected fluid flow path from coil 50 through valve 92 is controlled by operation of servomechanism or motor 96, which is operable to couple inlet port 94 and conduit 54 with either of first discharge port 98 or second discharge port 104 for, respectively, directing fluid flow either fully or partially through reheat coil 18 and conduit 102 for return to cooling tower 52.

Reheat coil 18 in the figures is interposed between discharge or outlet side 34 of DCC 12 and turbine inlet 19, and is operable to slightly elevate the discharge air temperature and control the relative humidity of the discharge air communicated to turbine 20. Reheating coil 18 is preferably a finned tube coupled to third valve 92 to receive warmed fluid from finned coil 50 of IEC 16 for heat transfer to air flowing past coil 18. Slight reheating of cooled discharge air is not counter productive, rather it provides both temperature and humidity control of the discharge air. In the preferred embodiment of FIG. 1, warmed coolant from IEC coil 50 and conduit 58 communicates through third servo control valve 92 to either reheat coil 18 for discharge air heating and relative humidity control, or to conduit 102 and cooling tower 52 for cooling and recycling to IEC 50. More specifically, conduit 54 communicates coolant fluid, which has been warmed during the cooling of air flow past coil 50, from IEC coil 50 to inlet port 94 of valve 92. This spent or warmed coolant fluid may be directed by third valve 92 and servomechanism 96, in response to a sensed signal from sensor 39, to communicate warmed coolant fluid to reheat coil 18 through first discharge port 98 and conduit 100, or alternatively to downstream conduit 102 through second discharge port 104 for return to cooling tower 52. Coolant fluid from reheat coil 18 is recycled through conduits 106 and 102 to cooling tower 52. Control and adjustment of the discharged air temperature may be controlled by varying volume of coolant flow through reheat coil 18, and may be responsive to environmental or operating parameters monitored, sensed or measured by sensor 39, which may be coupled to valve 92 to regulate its position to provide partial flow through coil 18 and divert the remainder of the fluid flow through bypass conduit 102.

Fan 110 with drive motor 112 in FIG. 1, is positioned between IEC 16 and DCC 12 to enhance air flow through system 10. This is an merely an exemplary fan location and not a limitation, as the use and location of fan 110 are a design choice. For example, fan 110 could also be located downstream of reheat coil 18. Air may flow through system 10 without using fan 110 by rotary induction from the turbine compressor blades (not shown) in gas turbine 20, which blades act to draw air flow through system 10 and act to obviate the use of fan 110. Although this arrangement is not the preferred method, back pressure or compressor reduces KW output from generator to a greater degree than back pressure associated with the use of fan 110.

Each of the several components in system 10, such as servo-operators 71, 90 and 96 of valves 70, 80 and 92, respectively, as well as pumps 42, 56, 68 and fan motor 112 may be manually operable or preset. They may also be coupled to and controlled by a controller 120, as known in the art. Controller 120 is operable to receive signals of measured parameters, such as air temperature, coolant temperatures, air flow speed, relative humidity pressures or other physical conditions from sensors 39, to provide control signals to the servo valves, pumps or motor based upon these sensed signals. In an illustrative control operation, sensors 146 and 148 are respectively positioned upstream and downstream of reheat coil 18. As an example, sensors 146, 148 spray provide signals, such as temperature, on lines 150, 152 to a comparator in controller 120 for generating a control signal to servomechanism 96 on line 154. Similar coupling and control signals may be provided to pumps 42, 68 and 56 on lines 156, 158 and 160, respectively from any of sensors 39, 146 and 148. In the figure sensor 39 is coupled to controller 120 by line 162 to provide the sensed signal to the controller. Similar output control signals may be provided from controller 120 to servomechanisms 71 and 90 on lines 162 and 164, respectively. The specific operating condition on physical parameter sensed by the sensors 39, 146 and 148, such as moisture or temperature, the choice of direct coupling of a sensor to a pump or servomechanism on the number and position of the sensors is a design choice and not a limitation. The specific operating condition, monitored physical parameter or sensing device is the choice of the owner and/or operator of system 10.

System 10 is designed for the cooling, air water vapor recovery and/or humidity control of air flow communicated to a gas turbine 20, but it is also operable, with all pumps de-energized, to allow transfer of ambient air to gas turbine 20 without a change in its physical characteristics. However, as gas turbines 20 for power generation are frequently utilized to supplement power generating equipment at peak-use periods, it is desirable to reduce the turbine inlet air temperature by communication of ambient air through at least one of IEC 16 and DCC 12 to increase gas-turbine power output, and reduce plant fuel consumption per unit output KW, which positive change in power availability and efficiency, during warm ambient periods is reflected by the relative slopes of the plotted curves in FIG. 10. As noted above in the example of FIG. 2, air transfer through a direct evaporative cooler 130, which coolant is about at ambient air temperature, can reduce the example 30% relative humidity ambient dry-bulb air temperature from 95.8 degrees Fahrenheit to 72.9 degrees Fahrenheit at 85% relative humidity, that is point Z to point C in FIG. 9 without utilizing any of ice-chiller 14, IEC 16 and reheat coil 18. However, gas-turbine inlet air temperature of about 44 degrees Fahrenheit with a relative humidity of about 85% is much more desirable, since it is assured, even when ambient relative humidity is well above 50 to 90%, a time when evaporative coolers are totally ineffective, as it provides very low temperature air to provide much greater KW output and lower fuel rate, with a reduced possibility of icing in the turbine, and the avoidance of turbine blade erosion by air-entrained moisture droplets.

Figure 3:
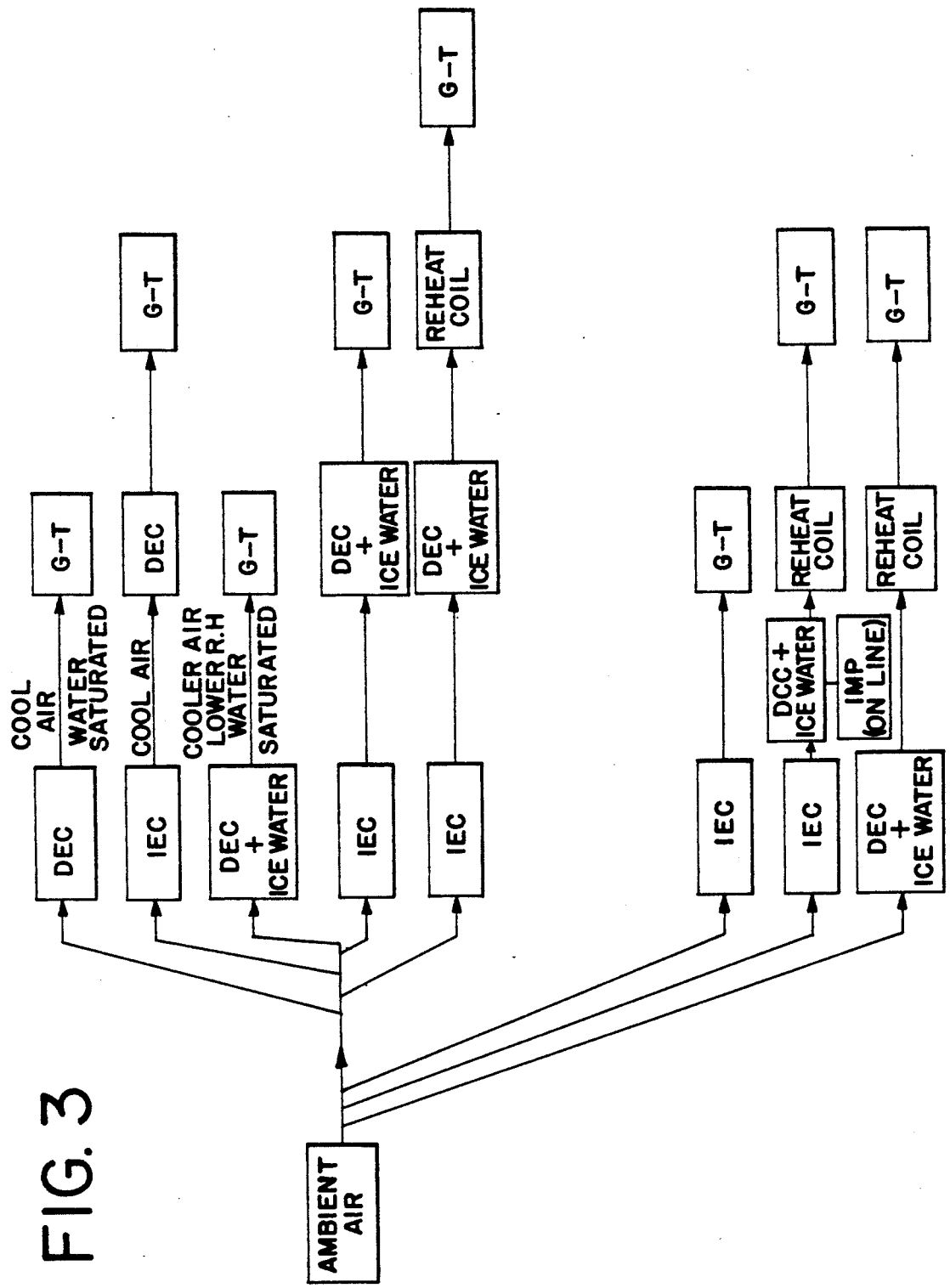
FIG. 3 illustrates some alternative cooling flow paths of ambient air through the multicomponent system of FIG. 1.

Attainment of lower temperature inlet air, as well as control of the relative humidity, may be accommodated by system 10 through a plurality of operational paths, as shown in FIG. 3 in block form. The precise plumbing network, ductwork, baffles and other apparatus to direct the air flow along a chosen flow path is not illustrated in the figures but is known in the art. The prior art operational mode illustrated in FIG. 2 by the sole utilization of evaporative cooler 130 for inlet air can only provide the above-noted change in temperature with low relative humidity ambient conditions. This dry bulb temperature depression can be expected to be about 90% of the differential between the ambient air wet-bulb and dry-bulb temperatures. The discharged air from this evaporative cooler, which is being transferred to turbine 20, may be moisture saturated in this operating mode but no specific provision is made for control of relative humidity. Thus, the potential exists for entrainment of suspended water particles, which may be detrimental to the blades of gas turbine 20.

As noted above, alternative modes of operation and alternative paths for air flow and coolant fluid flow in system 10 are noted in FIG. 3 in a block diagram flow chart where combinations of the several system components are arranged to provide discharge air to gas turbine (G-T) 20. The particular flow path for both the incoming air and the coolant fluids is the choice of the operator and may be a function of ambient air temperature and relative humidity, as well as the desired discharge air and load characteristics. Colder discharge air than is available from evaporative cooler 130 may be obtained using DCC unit 30 and ice-chiller 14 to reduce the temperature of coolant fluid to DCC unit 30, which coolant temperature may be about the freezing temperature of water. The chilled coolant temperature can be expected to be well below the wet-bulb temperature of the incoming air, which will further decrease the discharged air temperature. As the ice-water coolant fluid temperature is well below the incoming air dew-point, dehumidification will result, which condensed moisture will collect in sump 36 and may be utilized for other purposes. The final rewarmed coolant temperature from DCC unit 30 to sump 36, which is a measure of air cooling, will depend upon total heat transfer and the coolant volume, but the discharged air temperature from DCC unit 30 will decrease well below air which is evaporatively cooled with ambient-air-temperature water. In addition, the air density of the reduced temperature air will be increased above ambient air density.

Figure 12:
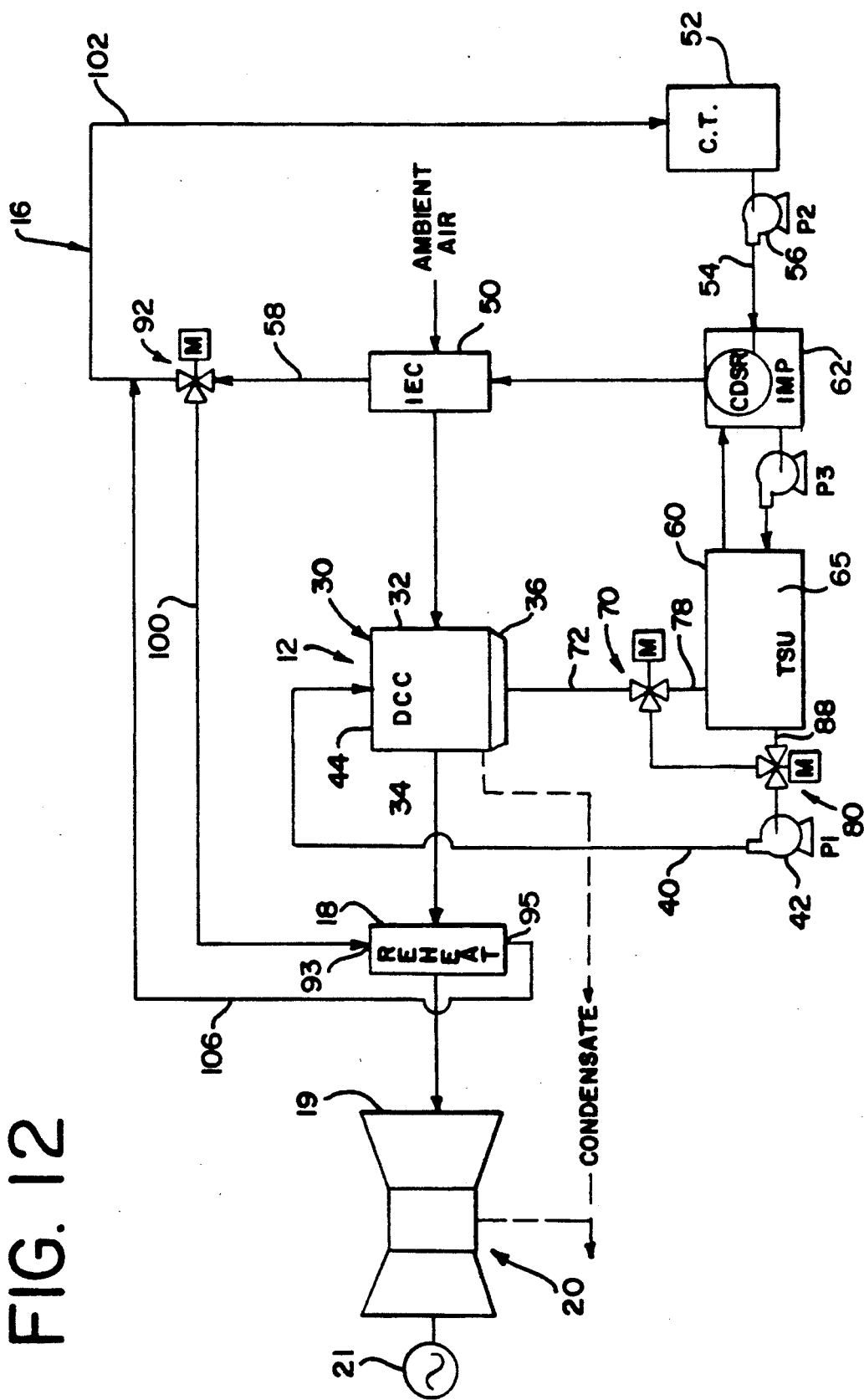
FIG. 12 illustrates the operating fluid and air flow paths for the system of FIG. 1; and, FIG. 13 illustrates an alternative embodiment providing for continuous supplemental and simultaneous cooling of the thermal storage unit and air to the gas turbine compressor.

Several of the operating modes listed at FIG. 3 are diagrammatically illustrated in FIGS. 4–8 and 12. In FIG. 12, ambient air is communicated past IEC coil 50, DCC unit 30 and reheat coil 18. Cooled second coolant from coolant tower 52 is being recirculated through conduit 54 to coil 50 for cooling the ambient air passing through the coil for communication to DCC 12. The coolant is illustrated as passing through IMP 62, however, without the condensor and compressor operating the effect upon this fluid flow path is nil, and a similar bypassing could be effected by a diverter valve and conduit arrangement. The coolant fluid in conduit 58 is shown as being diverted through valve 92 to both conduit 100 and conduit 102, which communicates the warmed fluid to cooling tower 52 for cooling and recycling through IEC coil 50. The ambient air, as shown in FIG. 3, is reduced in temperature from Z to A at a constant absolute humidity content, and communicates directly to DCC unit 30.

In FIG. 12, first coolant fluid is circulated through DCC 12 and TSU 60 to chill the coolant fluid and consequently, significantly reduce the air temperature far below its dew-point. More particularly, coolant fluid from sump 36 is transferred through conduits 72 and 78, and valve 70 to contact the chilled or frozen coolant in chamber 65. The intimate contact of the first coolant fluid and the frozen fluid, which is ice is an example, reduces the coolant fluid temperature. Pump 42 is directly coupled to chamber 65 through valve 80 and conduit 88 to pump the reduced temperature fluid from TSU chamber 65 through conduit 40 to DCC unit inlet 44. Gravity flow of this coolant fluid, which is at a significantly depressed temperature from ambient temperature, through the structural media in DCC unit 30 permits intimate contact with air flow therethrough. The air passing through DCC 30 from inlet side 30 to outlet side 34 is reduced in temperature to its dew-point and below, but it is essentially moisture saturated. At the dew-point, dehumidification and condensation of moisture from the air occur, which condensate is captured in sump 36. As the condensate is essentially deionized water it can be utilized in multiple processes including the treatment of products of combustion to reduce the nitrogen oxide emissions. Baring utilization of the condensate it may be otherwise drained to a waste system. The intermixing of the coolant water and condensate does not represent a contamination problem as many recirculating system utilize deionized water.

In the example of this FIG. 12, the warmed water from IEC coil 50 is at least partially communicated to conduit 100 and thus to reheat coil 18 and conduit 106 for return to conduit 102 and cooling tower 52. The reduced temperature-moisture saturated air from DCC outlet side 34 may not be desirable for many applications as discussed above. Therefore, the air temperature is slightly elevated to reduce the relative humidity and minimize the potential for damage to downstream apparatus, such as turbine blades, by entrained moisture or condensate from low-temperature air. In the particular structure of FIG. 12, the arrangement of the several components provides subtle benefits to the user. Specifically, utilization of IEC coil 50 to initially reduce the air temperature reduces the amount of air cooling required in DCC unit 30, which can provide an extended operating time for the chilled coolant in TSU chamber 65, reduce the required coolant flow through DCC unit 30 and thus pump capacity can alternatively allow greater air flow and treatment at the same pump capacity or it may be viewed as a means to increase the operating capacity of system 10.

Figure 11:
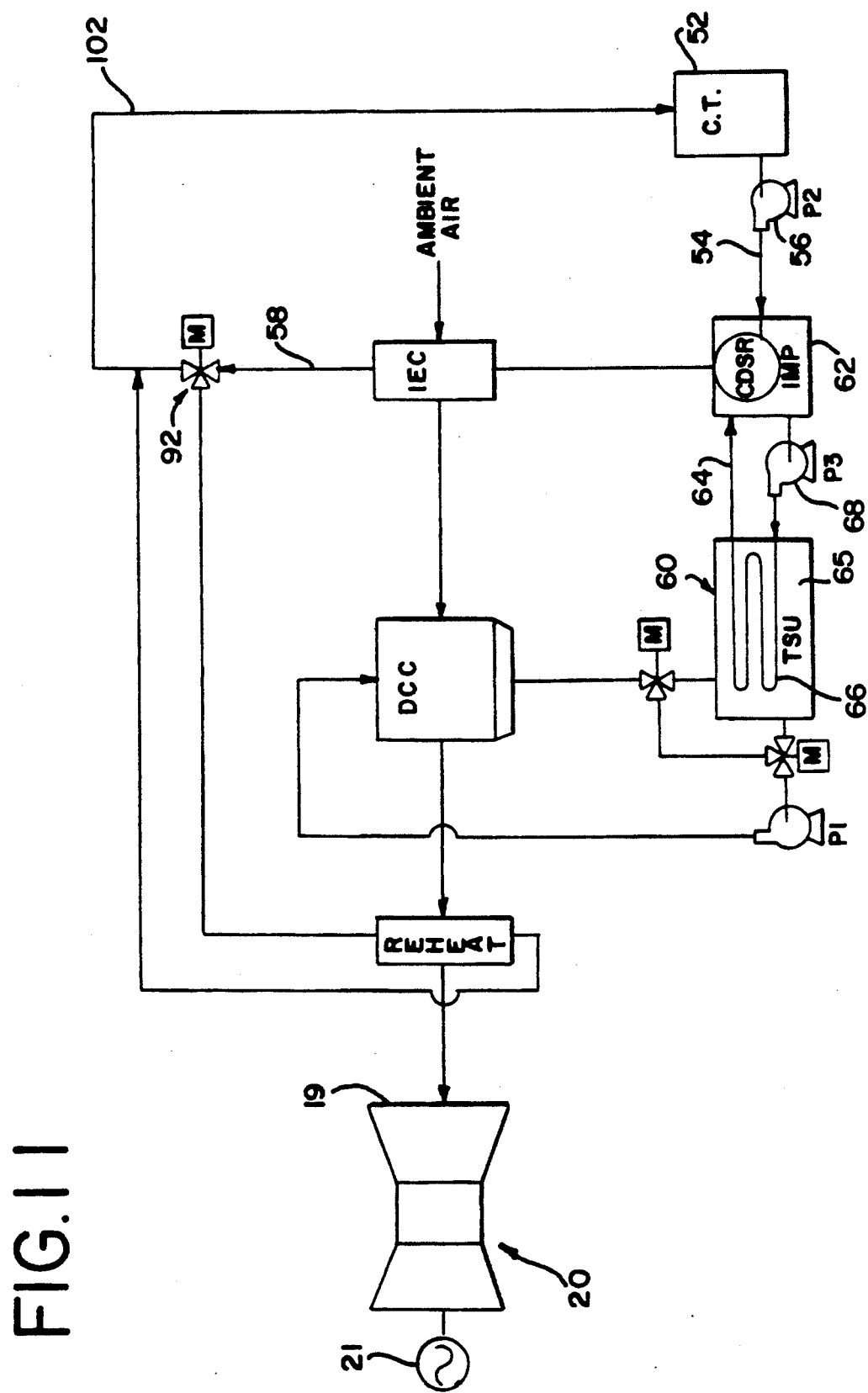
FIG. 11 illustrates the fluid flow path for ice-manufactured in the system of FIG. 1.

In a specific example of an electrical generator coupled to a turbine, the effects reducing the input air temperature from 101.6° F. to 42° F. can be shown to result in an output power gain from 52600 KW to 66630 KW, which is 14030 KW or about a 27% gain in power without increasing the generator or turbine size and without adding any undesirable emissions. The accomplishment of this increase in power does not require excessive power usage except for pump and for operations as the frozen coolant mass in TSU 60 is generated at a desirable period, that is minimum load periods, and utilized at peak load periods. The generation of the cooling mass in TSU 60 is illustrated in FIG. 11, where the second coolant fluid from cooling tower 52 is transferred to the condensor of IMP 62 and the refrigerant from IMP 62 is pumped by pump 68 through coils 66 in TSU chamber 65 to freeze or chill the first cooling fluid in TSU 60. The second fluid is recirculated through the fluid circuit of IEC 16 for return to cooling tower 52 without diversion through reheat coil 18. During the rebuilding cycle in TSU 60 in this preferred cycle no coolant fluid from sump 36 is communicated through chamber 65. However, it is recognized that in a dynamic situation both cooling mass buildup and first coolant fluid flow through TSU 60 could simultaneously occur, but at a reduced flow rate. The dynamics of any given system require determination of coolant fluid flow rates, ambient temperatures, system component capacities and operating needs. The specific individual operating mode is the choice of the user.

A further subtle consideration of the arrangement of DCC unit 30 and reheat coil 18 provides the coolest first coolant at the upper level of unit 30 and consequently it can be expected that this will provide the coolest discharge air. In contrast to this the warmest water from IEC 16 will be provided at the inlet 93 of reheat coil 18, which is aligned to react with the coldest discharge air which provides a further control consideration of the air transmitted to turbine inlet 19.

Figure 4:
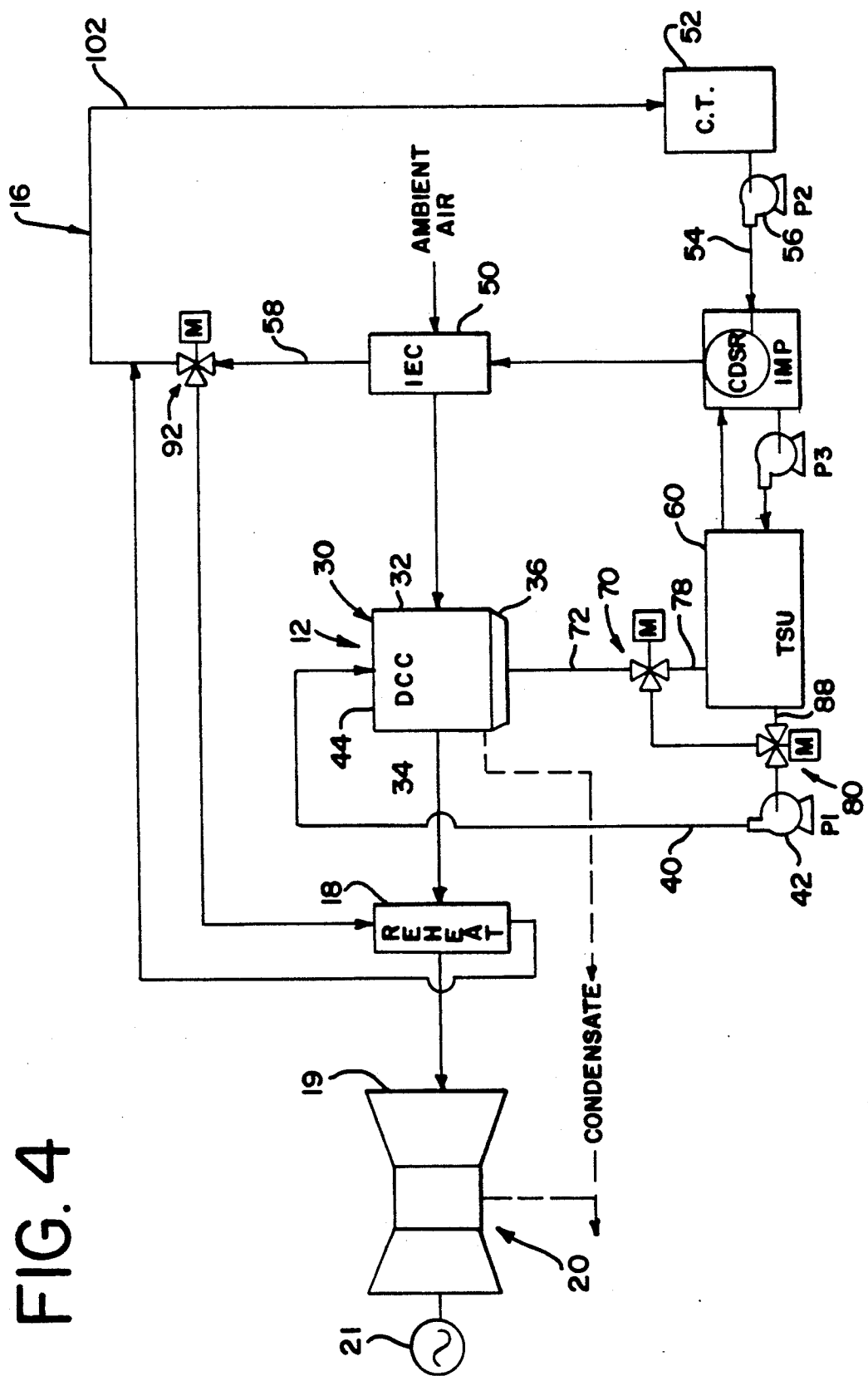
FIG. 4 illustrates a first operating mode of the system of FIG. 1.

As noted above, system 10 provides great flexibility to the operation in his choice of operating modes, which available modes are partially illustrated in FIGS. 4-8. In FIG. 4, second coolant fluid is circulated through IEC 16 and coil 50 to reduce the temperature of incoming ambient air without a reduction in moisture. Valve 92 maintains the complete fluid flow from coil 50 to conduit 102 for recycling to cooling tower 52. Pump 56 continues to maintain the fluid flow and IMP 62 is not operating, which eliminates any fluid pressure drops or added heat loads in IEC 16. The first coolant fluid is recirculating through DCC 12, including TSU 60, which provides air at outlet side 34 at about the dew-point but at a significantly reduced temperature. In this operating mode condensate will again be recovered in sump 36, however, the air communicated to turbine inlet 19 can be expected to be at or about 100% relative humidity. The net effect of this change in the air from ambient conditions to discharge air is illustrated in FIG. 9, where ambient air at point Z is reduced in temperature by IEC 16 to temperature A. Thereafter, the air passing through DCC unit 30, which is utilizing the chilled coolant from TSU 60, is reduced in temperature to the dew-point temperature for initiation of condensation. The final on discharge air temperature is noted at D, which is about the temperature of the chilled coolant. The specific temperature of the discharged air may be dependent on its flow rate through the system as well as the flow rates of the coolants and their actual temperatures.

Figure 5:
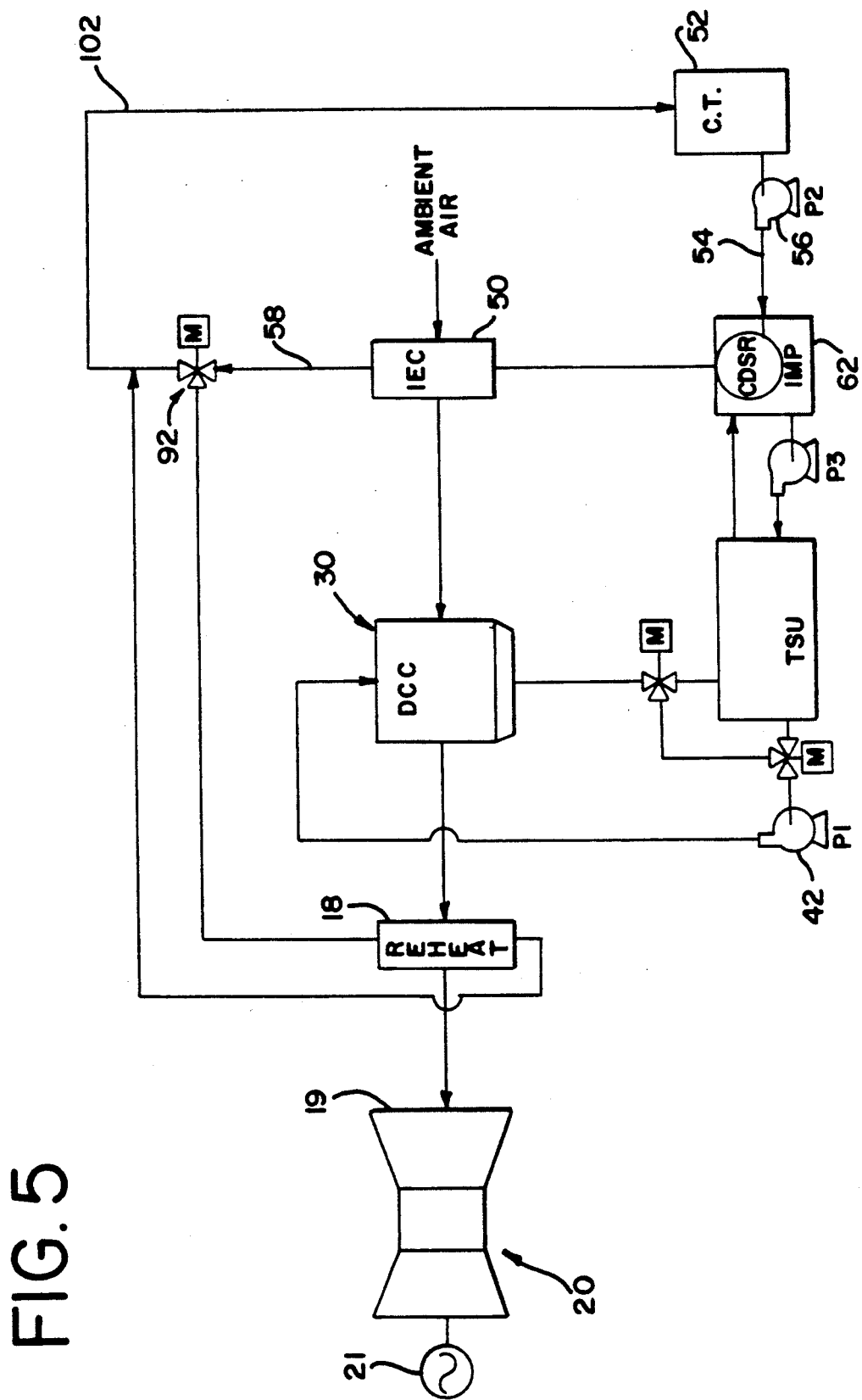
FIG. 5 illustrates a second operating mode of the system of FIG. 1.

In FIG. 5, IEC 16 is the sole air cooling component and at continuous operations second coolant fluid will be at about ambient air temperature. Fluid flow in DCC 12 is curtailed by deactivating pump 42, and no fluid flow is directed to reheat coil 18 by valve 92. The resultant air flow from IEC coil 50 passes through DCC unit 30 and reheat coil 18 for communication to turbine inlet 19 without further temperature reduction. The operation on effect of this IEC cooling is depicted in FIG. 9 by a change in the air characteristics from point Z to point A, which provides a reduced dry-bulb temperature but an increase in the relative humidity with no change in the total moisture content of the air. As the dew-point temperature is not attained, the air is not dehumidified.

Figure 6:
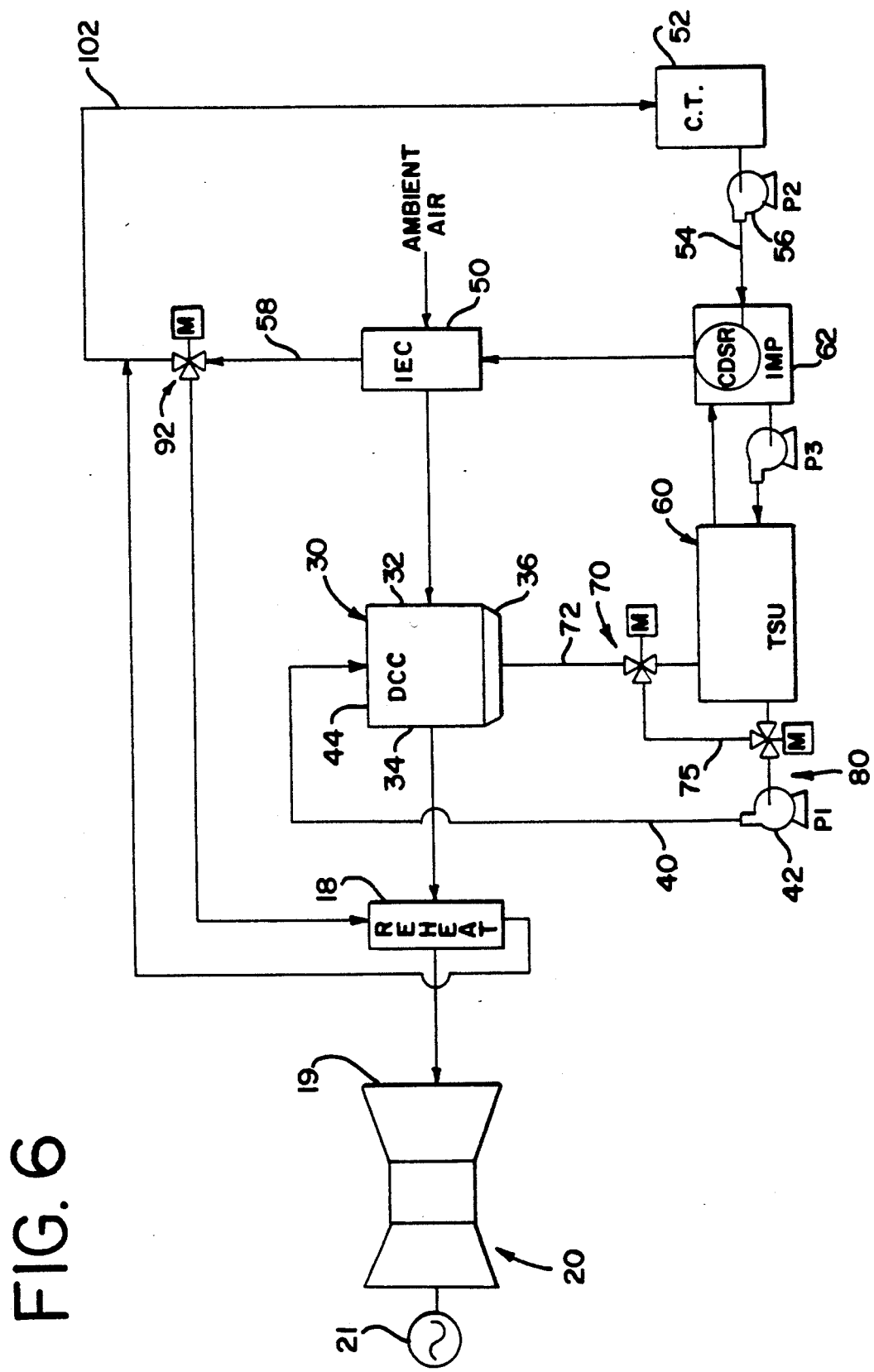
FIG. 6 illustrates a third operating mode of the system of FIG. 1.
Figure 8:
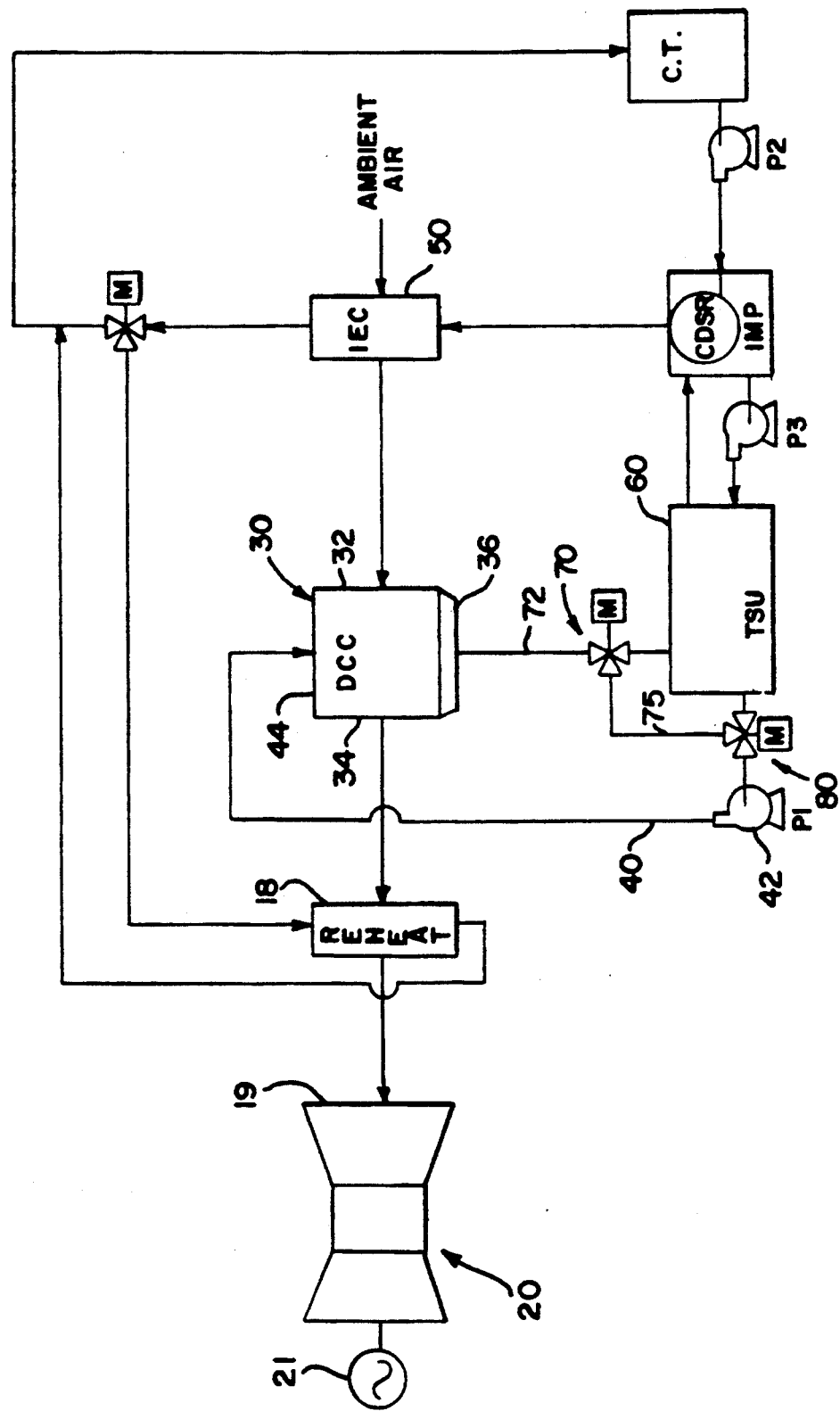
FIG. 8 is a fifth operating mode showing the availability of the prior art method of FIG. 2 with the system of FIG. 1.

The operating system illustrated in FIG. 6 utilizes IEC 16 and DCC 12 operating without TSU 60. In this operating mode, DCC unit 30 is operable as a direct evaporative cooler to provide a further reduction of the temperature from IEC 16. Valves 70 and 80 cooperate to isolate TSU 60 from coolant fluid flowing from sump 36 to pump 42, which pump 42 is recirculating coolant fluid to fluid inlet 40 and DCC unit 30 through conduit 40. IEC 16 communicates reduced temperature air to DCC unit 30 and reaction of this air at intimate contact with the first coolant fluid is the air contact media in DCC unit 30 further reduces the dry bulb temperature at a constant wet bulb temperature. This is more clearly demonstrated in FIG. 9 with ambient air being cooled from point Z to point A in IEC coil 50 and thereafter being cooled in DCC unit 30 in an evaporative manner to point C. This utilization of IEC 16 does provide both a reduced dry-bulb and wet-bulb temperature from those attainable by solely utilizing a direct evaporative cooler, which is the difference in enthalpy at point C and enthalpy at C, in FIG. 9. This reduction in enthalpy proportionally reduces the required size of the ice thermal storage unit and the required capacity of the ice making plant. The utilization of DCC unit 30 as a direct evaporative cooler is illustrated in FIG. 8 with first coolant fluid flow diverted from TSU 60.

Figure 7:
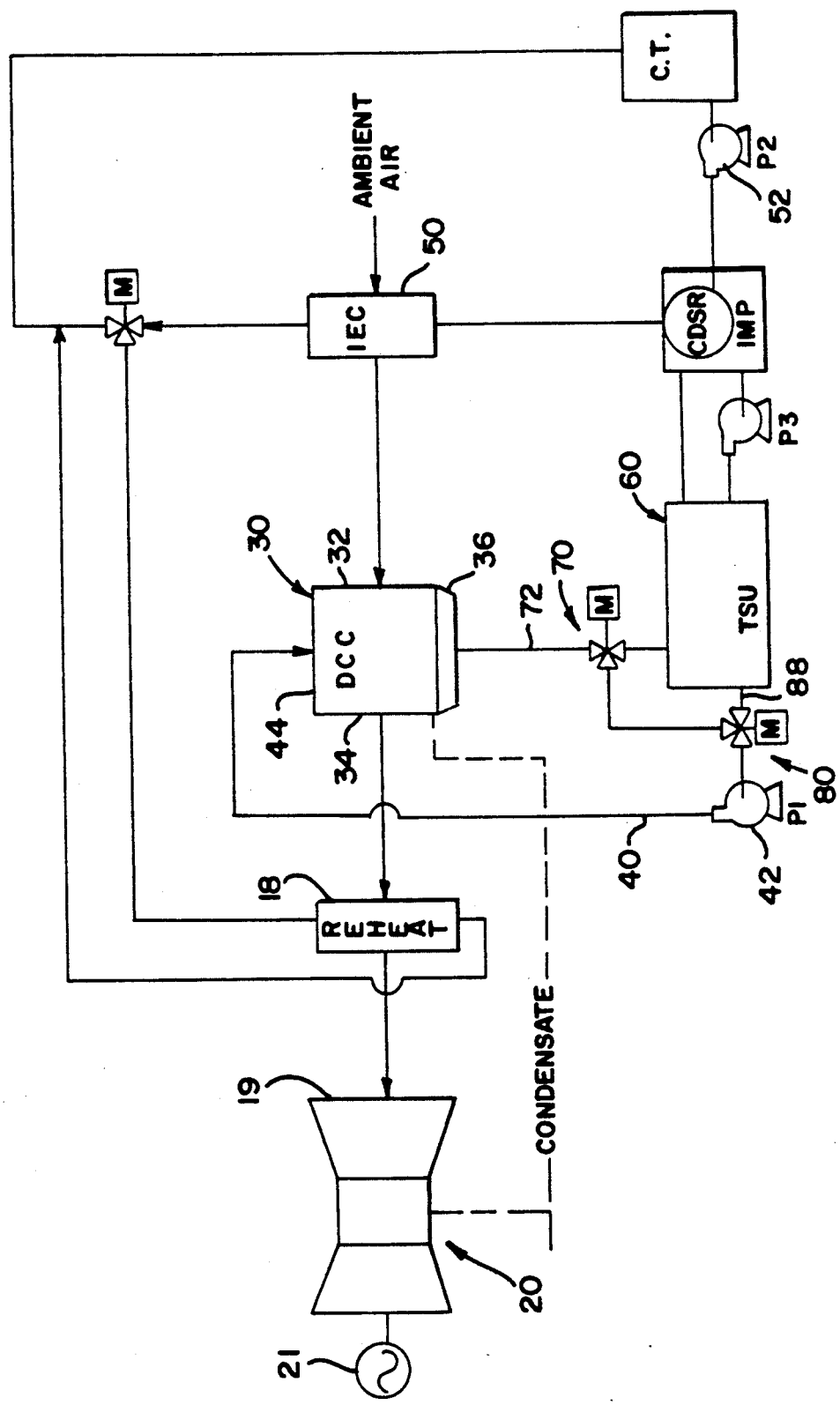
FIG. 7 illustrates a fourth operating mode of the system of FIG. 1.

The earlier allusion to the use of DCC 12 to act on the ambient air to reduce the air temperature is illustrated in FIG. 7. Ambient air is unaffected by its passage through IEC coil 50 as pump 56 is not circulating second coolant fluid through the fluid circuit of IEC 16. In addition, no fluid is communicated to reheat coil 18. The direct contact of ambient air with the coolant fluid on the media in DCC unit 30 provides an air temperature reduction down to the dew-point to initiate condensation and further temperature reduction to about the temperature of the coolant fluid. The discharging air at outlet side 34 is at or about the coolant fluid temperature and the dew-point moisture. Communication of the discharge air to turbine air inlet 19 is unaffected by the transplant through reheat coil 18.

All of the above discussions are premised upon adequate residence time of the air in each of the components and an appropriate operating temperature.

The above-noted system 10 permits temperature reduction and humidity control of ambient air for introduction to an air consuming apparatus. System 10 allows the operation great flexibility in the choice of components to attain a specific temperature and humidity level. More particularly, the structure of FIG. 1 provides apparatus to permit the following: indirect evaporative cooling of ambient air; direct chilling of the air to reduce both air temperature and absolute humidity; and, slight reheating of chilled air to reduce the relative humidity and minimize any entrained moisture droplets.

Further, each of the several components may be actuated at the election of the operator to act on the air passing therethrough. The choice of component actuation may be a function of a desired end point on discharge air temperature, absolute or relative, humidity, incoming air conditions on other operating parameters.

In the preferred embodiment of FIG. 1, system 10 coupled to gas turbine-generator 20 and is operable to provide reduced temperature air to turbine generator 20. Ambient air communicates past IEC coil 50 which is operable by the passage of second coolant fluid through cooling tower 52, conduits 54, 58 and 102, and IEC coil 50 to reduce the temperature of the air from Z to A at the same absolute humidity as shown in the psychrometric chart of FIG. 9.

Downstream of IEC 16 is DCC 12 with DCC unit 30 receiving the air stream. Unit 30 is operable as a direct evaporative cooler to reduce the temperature of the air but simultaneously moisture saturate it. Ice-chiller assembly 14 can cool the first coolant fluid circulating through unit 30 below the dew-point of the air. In operation with unit 30, the chilled coolant will react with the air from IEC coil 50, which may be either cooled or ambient air, to reduce the air temperature to and below the dew-point of the air entering DCC unit 30, which results in both air temperature reduction and dehumidification. The election to utilize ice chiller assembly 14 and more specifically thermal storage unit 60 is an election for the user-operator, and may depend upon the desired properties of the air transferred to turbine-generator 20. In a diurnal system, a cooling mass, such as ice, is generated and stored during one cycle, which cooling mass is then available for reducing the temperature of a contacting coolant fluid. This cooling-mass-generating cycle in the exemplary generator illustration may occur during an off-peak demand period, such as the night time, which minimizes the cost of generating the cooling mass (ice) as the cost of electrical power is usually lower for commercial users during the off-peak hours. The cooling mass in TSU 60 is then dormant until coolant from sump 36 is communicated through TSU 60. As this material is immediately available in the example of FIG. 1, it is readily apparent that its integration into the fluid flow circuit of DCC 12 requires a minimal effort, which can initiate temperature reduction of the coolant and consequently, the air transferred through DCC unit 30. As noted above, valves 70 and 80 can be arranged to throttle or control the flow through TSU 60 to adjust the coolant temperature, rate of ice-melting on other conditions.

The air flow thereafter passes through reheat coil 18, which is operable to heat the air from DCC unit 30. As a pragmatic matter, the elevation of the air temperature is generally a consideration only at very low air temperatures with the moisture at or about the dew-point. Reheat coil 18 is operable by the diversion of second coolant from conduit 58, which coolant has been warmed by the air cooling process in IEC coil 50. The warmed fluid is diverted by valve 92 through conduit 100 to reheat coil 18 and thereafter returned to conduit 102 for recycling through cooling tower 52. Reheat coil 18 is operable to slightly elevate the outlet air temperature from DCC unit 30 to reduce its relative humidity to about 85%, which will minimize the potential for entrained moisture.

Figure 13:
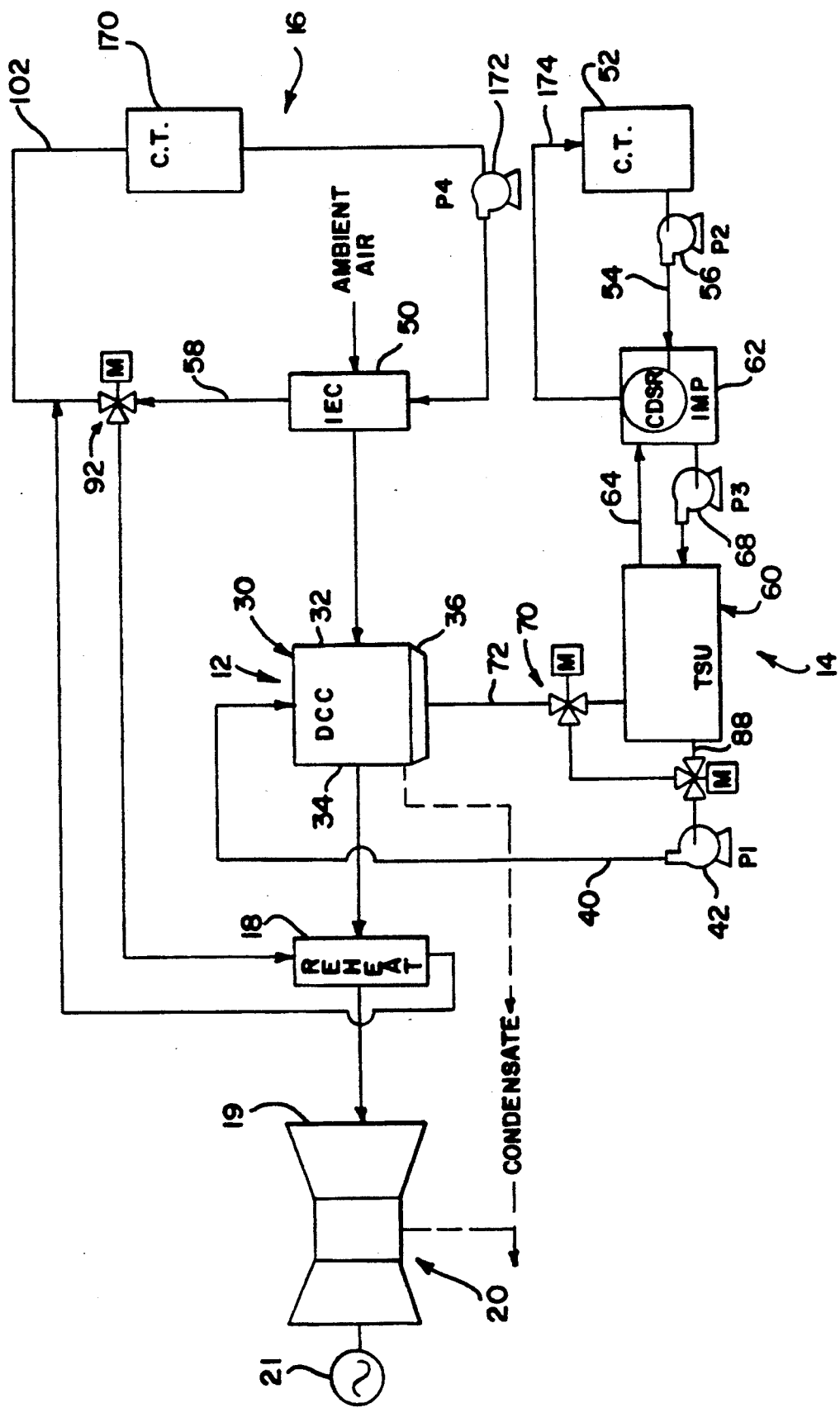

An alternative structural arrangement in FIG. 13 provides system 10 with a second cooling tower 170 independently coupled to and operable with IEC 16. In this structure, a pump 172 is coupled between IEC coil 50 and second cooling tower 170 to provide cooling fluid flow for operation of IEC 16. First, cooling tower 52 is independently coupled to IMP 62 for operation with the condensor, and is this component arrangement coolant fluid is recycled to first cooling tower 52 through conduit 174. This embodiment provides for simultaneous operation of both IEC 16 to cool the air and IMP 62 to cool the refrigeration fluid which may be refrigerant No. 22, ammonia or other refrigerants known in the art. In this configuration of system 10, IMP 62 is operable to continuously generate ice or chill the fluid in TSU 60 while IEC 16 is operable to cool the air. This allows DCC 12 to operate with chiller assembly 14, which allows retention of the chilled cooling mass for an extended period of time, thus permitting longer periods of chilled air communicable to gas turbine 20.

The operating components chosen and the degree of air temperature depression or dehumidification at each process step are elective with the user, which versatility and options can act to minimize system operating costs or alternatively provide alternative system configurations not requiring all of the several components.

While only specific embodiments of the invention have been described and shown, it is apparent that various alterations and modifications can be made therein. It is, therefore, the intention in the appended claims to cover all such modifications and alterations as may fall within the true scope and spirit of the invention.

What is claimed is:

1. A precooling system for combustion air communicated to a gas turbine, said system operable to receive ambient air at a wet bulb and dry bulb temperature, an ambient relative humidity and an ambient air density, and to provide said combustion air at a second temperature lower than ambient temperature and a second density greater than ambient density, said system comprising:

a direct-contact-air-chiller having a fluid-to-air exchange chilling, media, an air inlet side, an air outlet side, a fluid inlet, a cooling fluid at a first temperature, and a sump for recovery of coolant fluid passing through said media from said fluid inlet passage, said direct-contact-air-chiller operable to receive air at an ambient temperature and density for reduction of said ambient air temperature and absolute humidity, and to increase said air density for communication to said gas turbine;

means for reducing said cooling fluid temperature below said ambient wet-bulb temperature, which reduced-temperature fluid in said direct-contact-air-chiller is operable to reduce said ambient air temperature below said ambient wet-bulb temperature and to reduce said air absolute humidity;

a pump, a first conduit connected between said pump and said fluid inlet for communication of said coolant fluid to said fluid-temperature-reducing means, which coolant fluid passes through said chilling media to cool said ambient air communicating through said chilling media from said inlet side for discharge from said outlet side;

a first valve coupled to said sump and said fluid-temperature-reducing means, said first valve having a first servomechanism, a second conduit connected between said first valve and said fluid-temperature-reducing means;

a second valve having a second servomechanism and coupled to said pump, said first valve and said fluid-temperature-reducing means, said first valve operable by said first servomechanism to communicate fluid from said sump to any of said second valve and said fluid-temperature reducing means, which second valve is operable by said second servomechanism to communicate said coolant fluid from any of said first valve and said fluid-temperature-reducing means to said pump for recirculating coolant fluid at a predetermined fluid temperature to said direct contact chiller for treating said ambient air.

2. A precooling system for gas-turbine combustion air as claimed in claim 1, wherein said cooling fluid is water.

3. A precooling system for gas-turbine combustion air as claimed in claim 1, wherein said chilling media is a cross-flow arrangement.

4. A precooling system for gas-turbine combustion air as claimed in claim 1, wherein said chilling media is a counterflow arrangement.

5. A precooling system for gas-turbine combustion air as claimed in claim 1, wherein said chilling media is a parallel flow arrangement.

6. A precooling system for gas-turbine combustion air as claimed in claim 1, wherein said predetermined air temperature is about 44 degrees Fahrenheit.

7. A precooling system for gas-turbine combustion air as claimed in claim 1, wherein said means for reducing said fluid temperature is a thermal storage system having an ice making plant and a thermal storage unit defining a chamber for retention of coolant fluid and ice, means for refrigerating positioned in said thermal storage unit and operable to produce said ice, said refrigerating means coupled to said ice making plant;

said second conduit connecting and providing fluid communication from said first valve and sump to said chamber to contact said cooling fluid with said ice for cooling-fluid temperature reduction for recirculation to said fluid inlet.

8. A precooling system for gas-turbine combustion air as claimed in claim 7 further comprising means for sensing said fluid temperature and operable to provide a signal;

a line connecting said sensing means and at least one of said first valve servomechanism, said second valve servomechanism and said pump, which at least one element is responsive to said signal to control cooling fluid flow and communication through said first valve to said chamber and second valve.

9. A precooling system for gas-turbine combustion air as claimed in claim 7 further comprising means for sensing one of said combustion air temperature and relative humidity and operable to provide a signal, a line connecting said means for sensing and at least one of said first and second valve servomechanisms, which servomechanisms are responsive to said signal to control said cooling-fluid flow through said first and second valves to control said one sensed combustion air parameter.

10. A precooling system for gas-turbine combustion air as claimed in claim 9 further comprising a reheating coil downstream of said direct contact chiller;

means for heating said reheating coil to elevate said combustion air temperature to about said predetermined temperature and reduce the relative humidity.

11. A precooling system for gas-turbine combustion air as claimed in claim 10 further comprising an indirect evaporative cooler to reduce said ambient air temperature of said inlet air upstream of said direct-contact-chiller apparatus.

12. A precooling system for combustion air communicated to a gas turbine as claimed in claim 7 wherein said means for refrigerating is a cooling coil positioned in said chamber and having a refrigerant therein;

said ice-making plant having an evaporator, a condenser, an expansion device and a compressor coupled to said cooling coil, said ice-making plant operable with said coil and refrigerant to cool and freeze said cooling fluid in said chamber.

13. A precooling system for combustion air communicated to a gas turbine, said system operable to receive ambient air at a wet bulb and dry bulb temperature, an ambient relative humidity and an ambient air density, and to provide said combustion air at a second temperature lower-than-ambient air temperature and greater-than-ambient air density, said system comprising:

a direct-contact-chiller with a fluid inlet, a sump and a first fluid for cooling, said direct-contact-chiller operable to receive air and reduce the air temperature;

means for reducing said first-coolant-fluid temperature below said ambient-air, wet-bulb temperature, which cooled fluid is operable to reduce said air temperature below said air wet-bulb temperature and to reduce the air absolute humidity;

first means for recirculating said first coolant fluid from said sump to said direct-contact-chiller fluid inlet;

means for coupling said first recirculating means and said fluid-temperature-reducing means to communicate spent first cooling fluid form said sump and, to channel and control the rate of cooling fluid flow to said recirculating means and said fluid-temperature-reducing means to provide cooling fluid at said fluid inlet at a predetermined fluid temperature for said direct-contact-chiller;

an indirect-evaporative-cooler with a second fluid for cooling, said indirect evaporative cooler having a tubular coil with a fluid passage, an entry end and an exit end, at least one fin mounted on said tubular coil to enhance air contact and heat transfer.

a cooling tower for said second cooling fluid, which has a second fluid inlet passage and a second sump;

second means for recirculating said second cooling fluid coupled between said cooling-tower sump and said cooling-tower second fluid inlet passage, said tubular coil serially positioned between said second means for recirculating and said cooling-tower second fluid inlet passage for recirculating said second coolant fluid through said coil;

said indirect evaporative cooler operable to receive said ambient air and pass it past said coil for reduction of said ambient air temperature, maintenance of said air absolute humidity and communication of said air to one of said direct-contact-chiller and said gas turbine.

14. A precooling system for gas-turbine combustion air as claimed in claim 13 wherein said direct-contact chiller and said cooling tower are cross-flow arrangements.

15. A precooling system for gas-turbine combustion air as claimed in claim 13 wherein said direct-contact chiller and said cooling tower are counterflow arrangements.

16. A precooling system for gas-turbine combustion air as claimed in claim 13 wherein said direct-contact chiller and said cooling tower are parallel flow arrangements.

17. A precooling system for gas-turbine combustion air as claimed in claim 13 wherein said first means for recirculating has a conduit communicating between said first sump and said direct-contact chiller fluid inlet passage, and a pump positioned in said conduit to recirculate said first cooling fluid from said sump to said direct-contact-chiller fluid inlet passage.

18. A precooling system for gas-turbine combustion air as claimed in claim 17 further comprising a second conduit and a second pump mounted in said second conduit;

said second pump operable to recirculate said second cooling fluid through said second conduit, finned coil and said cooling tower.

19. A precooling system for gas-turbine combustion air as claimed in claim 18 further comprising first means for sensing one of said temperature and relative humidity of said air to said gas-turbine, which sensing means provides a signal; said first sensing means coupled to said second pump to communicate said sensed signal, which second pump is actuable to circulate said second coolant through said tubular coil.

20. A precooling system for gas-turbine combustion air as claimed in claim 18 further comprising a reheating coil downstream of said direct contact chiller and indirect evaporative cooler, said reheating coil having a fluid passage with an inlet end and an exit end;

means for coupling positioned in said second conduit and connected to said reheating coil inlet end, said reheating coil exit end connected to said second conduit downstream of said coupling means;

said coupling means operable to receive said second cooling fluid downstream of said indirect-evaporative tubular finned coil and to communicate a second cooling fluid to said second conduit and, to said reheating coil to slightly reheat said combustion air to a predetermined temperature, to reduce the relative humidity, while holding contact absolute humidity.

21. A precooling system for gas-turbine combustion air as claimed in claim 20 further comprising second means for sensing one of said combustion air temperature and relative humidity to provide a sensed signal;

said means for coupling a two-way valve with a servomechanism connected to said second sensing means, said servomechanism operable to couple said valve, said second conduit and said reheating coil in response to said second signal to control said combustion air temperature and relative humidity.

22. A precooling system for gas-turbine combustion air as claimed in claim 18 and further comprising a motor drive fan to accelerate said air flow through said system to said gas turbine.

23. A method for providing reduced-temperature air to a gas-turbine at a temperature less than air cooled by a fluid at about ambient air temperature, said reduced-temperature air is at a density greater than ambient air density, said reduced-temperature air provided through a system having a direct-contact air chiller with a sump, a fluid inlet and a cooling fluid recirculable through said direct-contact-chiller to cool air passing therethrough, means for recirculating said fluid between said sump and said inlet, and means for coupling said sump and recirculating means, said method comprising:

a. providing an ice-chiller apparatus with a thermal storage unit for receiving and reducing the temperature of said cooling fluid;

b. connecting said sump and said thermal storage unit with said coupling means for communication of said fluid to said thermal storage unit;

c. communicating said cooling fluid from said sump to said thermal storage unit for reducing the temperature of said cooling fluid below said ambient-air temperature;

d. coupling said thermal storage unit to said recirculating means to communicate said reduced-temperature fluid to said inlet and cooler;

e. providing an indirect-evaporative-cooler operable to receive said ambient air and reduce the temperature of said ambient air to a second temperature less than said ambient-air temperature;

f. channeling said ambient air through said indirect-evaporative-cooler for communication to one of said gas turbine and said direct-contact-chiller; and, g. reducing the temperature of said air at said second temperature in said direct-contact-chiller to provide said reduced-temperature air to said gas turbine at a third temperature less than said second temperature and said first-reduced temperature.

24. The method for providing reduced-temperature as claimed in claim 20 and further comprising:

a. providing means for reheating said reduced-temperature air to said gas turbine;

b. communicating said air from said direct-contact-chiller and said indirect-evaporative-cooler through said reheating means; and, c. elevating the temperature of said air passing through said reheating means to a predetermined fourth temperature at a relative humidity less than a predetermined relative humidity for transfer to said gas turbine.

25. A air precooling system operable to receive ambient air at a wet bulb and dry bulb temperature, an ambient air relative humidity and an ambient air density and to discharge air at a predetermined lower than ambient temperature and greater than ambient air density, said system comprising:

a direct-contact-air chiller with a first fluid for cooling, a fluid inlet and a fluid sump;

an indirect evaporative cooler with a second fluid for cooling;

means for reducing said first cooling fluid temperature below said ambient air wet-bulb temperature;

first means for recirculating said first cooling fluid;

first means for coupling said sump to said cooling fluid-temperature reducing means and said first recirculating means to said direct evaporative cooler, said first means for recirculating operable to transfer said first cooling fluid from said fluid sump to said fluid inlet from each of said direct contact chiller fluid sump and said fluid temperature reducing means;

second means for recirculating said second cooling fluid through said indirect evaporative cooler;

a first cooling tower coupled downstream of said indirect evaporative cooler and upstream of said second recirculating means, said cooling tower operable to receive said second cooling fluid;

means for reheating said discharged air, which reheating means has a reheating-means inlet port and a discharge port;

second means for coupling said second recirculating means and said reheating means at said reheating-means inlet port downstream from said indirect evaporative cooler, which reheating means is coupled to said second recirculating means at said discharge port downstream of said second coupling means, said reheating means operable to warm said discharge air to about said predetermined temperature and reduce the relative humidity at a constant absolute humidity.

26. An air precooling system as claimed in claim 25 wherein said means for reducing said first cooling fluid temperature has an ice-making plant utilizing a refrigerant for freezing, said system further comprising a second cooling tower coupled to and operable with said ice-making plant.

27. A precooling system for combustion air communicated to a gas turbine, said system operable to receive ambient air at a wet bulb and dry bulb temperature, an ambient air relative humidity and an ambient air density and to provide said combustion air at a predetermined lower than ambient temperature and a greater than ambient air density, said system comprising:

a direct-contact-air chiller with a first fluid for cooling, media for cooling, an air inlet side, an air outlet side, a fluid inlet and a fluid sump for recovery of said first cooling fluid flowing through said media;

an indirect evaporative cooler with a second fluid for cooling;

means for reducing said first cooling fluid temperature below said ambient air wet-bulb temperature;

first means for recirculating said first coolant fluid, said recirculating means having a first pump and a first conduit between said first pump and said direct-contact-air chiller fluid inlet;

first means for coupling said sump with said first recirculating means and said fluid temperature reducing means for communication of said first cooling fluid to said fluid-temperature-reducing means and said first recirculating means;

said first recirculating means connected to said direct-contact-air chiller fluid inlet for communication of said first cooling fluid from said sump and said fluid-temperature-reduction means to said fluid inlet and said media to cool said ambient air passing from said air inlet side to said air outlet side;

said first coupling means having a first valve, a second valve and a second conduit connecting said first valve and said fluid temperature reducing means, said first valve having a first servomechanism, said first valve coupled to said sump and said second valve, which first valve is operable to said first servomechanism to communicate first cooling fluid from said sump to said second valve and said fluid-temperature-reducing means, said second valve having a second servomechanism, said second valve coupled to said first pump and said fluid-temperature-reducing means, said second servomechanism operable to actuate said second valve to communicate said first cooling fluid from said first valve and from said fluid-temperature-reducing means to said first pump for recirculation of said direct-contact-air chiller fluid inlet;

second means for recirculating said second cooling fluid through said indirect evaporative cooler;

means for reheating said discharged air, which reheating means has a reheating-means inlet port and a discharge port;

second means for coupling said second recirculating means and said reheating means at said reheating-means inlet port downstream from said indirect evaporative cooler, which reheating means is coupled to said second recirculating means at said discharge port downstream of said second coupling means, said reheating means operable to warm said discharge air to about said predetermined temperature and reduce the relative humidity at a constant absolute humidity.

28. A precooling system for gas-turbine combustion air as claimed in claim 27 wherein said media for cooling is provided in a crossflow arrangement.

29. A precooling system for gas-turbine combustion air as claimed in claim 27, wherein said media for cooling is provided in a counterflow arrangement.

30. A precooling system for gas-turbine combustion air as claimed in claim 27, wherein said media for cooling is provided in a parallel flow arrangement.

31. A precooling system for gas-turbine combustion air as claimed in claim 27 wherein said predetermined discharge air temperature is about 44 degrees Fahrenheit.

32. A precooling system for gas-turbine combustion air as claimed in claim 27, wherein said predetermined discharge relative humidity is less than 85 percent.

33. A precooling system for gas-turbine combustion air as claimed in claim 27, wherein said indirect evaporative cooler has a cooling tower with a second sump and a tower fluid inlet passage, a tubular coil having a through-bore, an input end, an exit end and at least one fin mounted on said tubular coil for enhanced heat transfer;

said second means for recirculating having a second pump and a third conduit, said second pump coupled between said tower sump and tubular coil input end;

said second means for coupling is a third valve with a third servomechanism, said third valve coupled to said tubular coil exit end, said reheating coil input port and said third conduit, which third conduit is coupled to recycle said second fluid to said tower inlet passage downstream of said third valve;

said reheating coil exit end coupled to said third conduit for fluid transfer to said tower inlet passage;

said third valve operable by said third servomechanism to couple said third conduit and reheat coil for second fluid communication downstream of said tubular coil for recirculation to said tower.

34. A precooling system for gas-turbine combustion air as claimed in claim 33, wherein said reheating coil has a tubular member with a through passage and at least one heat-exchanging fin mounted on said tubular member to enhance heat transfer between combustion air and said tubular member, said reheating coil arranged upstream of said gas turbine and downstream of said direct and indirect evaporative coolers and electively engageable to reheat said combustion air to elevate said air temperature and reduce said inlet air relative humidity at constant absolute humidity.

35. A precooling system for gas-turbine combustion air as claimed in claim 34 further comprising at least one means for sensing said combustion air temperature and coupled to at least one of said first valve, second valve and third valve servomechanisms to control said at least one valve and cooling fluid communication therethrough.

36. A precooling system for gas-turbine combustion air as claimed in claim 35 further comprising a fan for accelerating said air through said system to said gas turbine.

* * * * *